(12) United States Patent
Matsushita et al.

(10) Patent No.: US 9,015,926 B2
(45) Date of Patent: Apr. 28, 2015

(54) METHOD FOR PRODUCING A MOTOR ROTOR

(75) Inventors: Masayuki Matsushita, Toyota (JP); Kimimasa Murayama, Toyota (JP); Koji Matsuno, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/113,040

(22) PCT Filed: Apr. 22, 2011

(86) PCT No.: PCT/JP2011/059893
§ 371 (c)(1),
(2), (4) Date: Oct. 21, 2013

(87) PCT Pub. No.: WO2012/144059
PCT Pub. Date: Oct. 26, 2012

(65) Prior Publication Data
US 2014/0041207 A1   Feb. 13, 2014

(51) Int. Cl.
*H02K 5/02* (2006.01)
*H02K 15/02* (2006.01)

(52) U.S. Cl.
CPC .............. *H02K 15/02* (2013.01); *H02K 15/028* (2013.01)

(58) Field of Classification Search
CPC ............................. H02K 15/02; H02K 15/028
USPC ........................................................... 29/598
See application file for complete search history.

(56) References Cited

U.S. PATENT DOCUMENTS

| 5,894,654 | A | 4/1999 | Varis et al. | |
|---|---|---|---|---|
| 2008/0122311 | A1* | 5/2008 | Werst et al. | 310/217 |
| 2008/0174200 | A1 | 7/2008 | Okamoto et al. | |

FOREIGN PATENT DOCUMENTS

| JP | 07-022168 A | 1/1995 |
|---|---|---|
| JP | 08-500719 H | 1/1996 |
| JP | 11-089186 | 3/1999 |
| JP | 2006-217770 A | 8/2006 |
| JP | 2008-178253 A | 7/2008 |
| JP | 2008-199831 A | 8/2008 |
| JP | 2010-004618 A | 1/2010 |

\* cited by examiner

*Primary Examiner* — Livius R Cazan
(74) *Attorney, Agent, or Firm* — Kenyon & Kenyon LLP

(57) ABSTRACT

In a method for producing a motor rotor, a lamination stack made up of stacked thin steel sheets each formed with a through hole, the lamination stack having a shaft bore formed of the through holes aligned with one another, is retained as a rotor core in a thickness direction with a pair of jigs from both sides, and a shaft is inserted into the shaft bore and joined to the lamination stack by shrink fitting. Each jig includes a shaft hole, a radially inner peripheral portion for holding a peripheral edge of the shaft bore of the lamination stack at a position, in a radial direction of the shaft hole, surrounding the shaft hole radially inside; and a radially outer peripheral portion for holding the outer periphery of the lamination stack. The radially inner and outer peripheral portions are positioned at different heights in a jig height direction.

13 Claims, 15 Drawing Sheets

METHOD FOR PRODUCING A MOTOR ROTOR

CROSS REFERENCE TO RELATED APPLICATION

This is a national phase application based on the PCT International Patent Application No. PCT/JP2011/059893 filed on Apr. 22, 2011, the entire contents of which are incorporated herein by reference.

TECHNICAL FIELD

The present invention relates to a method for producing rotors for motors to be mounted in, for example, hybrid cars or the like, wherein a rotating shaft of the rotor is inserted in a shaft bore of a rotor core made up of a stack of steel sheets to integrally join or fix the shaft with the rotor core.

BACKGROUND ART

A motor rotor consists of a rotor core, which is made up of a stack of thin steel sheets, each having a through hole in the center formed by punch pressing, a shaft inserted into the shaft bore of the rotor core and securely press-fitted thereto, and magnets mounted in the rotor core.

As one example of a conventional producing method for securely joining the rotor core and the shaft, a fastening structure for the rotor core and the shaft of a motor is disclosed in Patent Document 1. FIG. 14 shows a perspective view of the rotor core disclosed in Patent Document 1. FIG. 15 shows part of a thin steel sheet forming the rotor core as viewed from the direction of an arrow C in FIG. 14. FIG. 16 is a diagram illustrating a condition where a motor shaft has been inserted into the through hole in the rotor core as viewed from the direction of the arrow C in FIG. 14.

According to Patent Document 1, as shown in FIG. 14 and FIG. 15, a through hole 312H in a thin steel sheet 312 is formed with circumferentially equally spaced and alternately arranged indentations 303 and protrusions 304 having different radial lengths. The rotor core 310 is made up of a plurality of such thin steel sheets 312 stacked upon one another such that the indentations 303 of one thin steel sheet 312 are located at the same phase positions of the protrusions 304 of adjacent thin steel sheets 312.

The motor shaft 320 has uneven portions 324 formed by knurling on the outer surface and is inserted into a press-fit hole 311H of the rotor core 310, which is formed by the through holes 312H (with indentations 303 and protrusions 304) of the stack of thin steel sheets 312. According to Patent Document 1, as shown in FIG. 16, when press-fitted, because of the indentations 303 and protrusions 304 of the thin steel sheets 312, the motor shaft 320 has contact portions and non-contact portions as the uneven portions 324 make discontinuous contact with the sheets. According to Patent Document 1, as shown in FIG. 16, each thin steel sheet 312 is allowed to freely deform and deflect toward the axial center AX of the rotor core 310 when the motor shaft 320 is press-fitted into the rotor core 310, so that no stress remains in the rotor core 310 or the motor shaft 320 and that there will be no scratches or burrs after the press-fitting of the motor shaft 320.

FIG. 17 shows another example of a conventional producing method for securely joining a rotor core and a shaft similarly to Patent Document 1 (no particular patent document cited). In this conventional producing method, a rotor core 410 or a stack of thin steel sheets 412 is retained and fastened with a predetermined clamping force, with plate-like jigs 431 and 432 that make surface contact with both end faces 411a and 411b of a lamination stack 411 in the thickness direction HT. The rotor core 410 is heated in this state by high-frequency quenching or the like, and a shaft 420 is inserted into a shaft bore 411H, which has been somewhat enlarged by thermal expansion, after which the rotor core 410 is cooled, so that the rotor core 410 is securely joined to the shaft 420 by shrink fitting.

RELATED ART DOCUMENTS

Patent Documents

Patent Document 1: JP 2006-217770A

SUMMARY OF THE INVENTION

Problems to be Solved by the Invention

However, there were the following two problems in the conventional techniques for securely joining the rotor core and the shaft.

(1) When the shaft is press-fitted, each of the stack of thin steel sheets is subjected to the stress in the axial direction of the rotor core and undergoes distortion in the axial direction. In Patent Document 1, the stress applied to the rotor core 310 or the motor shaft 320 when the motor shaft 320 is press-fitted into the rotor core 310 is released toward the axial center AX of the rotor core 310. However, no measure is provided to release the stress in the axial direction (up and down direction in FIG. 14) of the rotor core 310 in Patent Document 1. Any residual stress in the axial direction of the rotor core 310 would cause distortion toward the axial center AX of the rotor core 310, which may lead to a deformation of the rotor core 310 with an axial displacement between a portion near the through holes 312H and near the outer rim of the thin steel sheets 312.

FIG. 18 and FIG. 19 show schematic diagrams of how a lamination stack distorts axially by shrink fitting. In the other example of conventional producing method described above, the lamination stack 411 which is a stack of thin steel sheets 412 oriented in the same punching direction is retained with a large clamping force of a pair of jigs 431 and 432. The lamination stack 411 is heated so that there is a clearance in the shaft bore 411 H when the shaft 420 is inserted thereinto, after which the lamination stack 411 is cooled. When cooled, the lamination stack 411 undergoes distortion in the axial direction HT toward the shaft entrance side (lower side in FIG. 18) or the shaft exit side (upper side in FIG. 19) by the shrink fit allowance. As a result, with this conventional producing method, too, similarly to the case with Patent Document 1, there occurs a displacement between a shrink fit portion Q1 between the shaft bore 411 H of the lamination stack 411 and the shaft 420, and outermost portions Q2 and Q3 of the lamination stack 411 in the axial direction HT. The direction and amount of this displacement varies among the products (rotors) so much that, in the rotor core 410, the variation range in which the lamination stack 411 is displaced farthest to the shaft entrance side and to the shaft exit side, i.e., the sum of the distance between the shrink fit portion Q1 and the outermost portion Q2 and the distance between the shrink fit portion Q1 and the outermost portion Q3, can be as large as about 2 mm, for example.

FIG. 20 is a schematic diagram showing part of a motor having the rotor assembled with the stator. In the motor having the rotor 403 with the rotor core 410 largely deformed in the axial direction HT, as shown in FIG. 20, the stator 402, which is formed to have a constant thickness in the axial direction HT of the rotor 403, cannot be arranged opposite the rotor core 410 in the rotor radial direction RD, as the rotor core is distorted in the axial direction HT inside the rotor 403. Namely, part of the lamination stack 411 forming the rotor core 410 is displaced from the stator 402 in the axial direction HT of the rotor 403 relative to the stator 402, so that there will be areas where the magnetic forces act less between the rotor and the stator 402. As a consequence there will be some loss in generating rotational force by the motor, i.e., the motor performance cannot be fully exhibited.

(2) The through hole of each thin steel sheet, which will form the shaft bore of the rotor core (lamination stack) is different in the configuration of its peripheral portion after the punching such as inclination of the inner circumferential face (fitting face), thickness of the shear layer, or burrs at the end. Since the through hole is formed in each thin steel sheet by punch pressing one by one, quality control of the entire shaft bore of the rotor core for the shaft to pass through based on the through hole configuration of each thin steel sheet is practically impossible. As one measure for avoiding the problems noted above under (1), with an assumption that there will be a variation of about 2 mm between the outermost portions of the lamination stack, the stator thickness is increased in consideration of an increase in the axial thickness of the rotor core to at least accommodate this variation range. This can reduce areas where the magnetic forces act less between the rotor and the stator and improves the assembling accuracy of the rotor core and the shaft, to some extent. However, if one thin steel sheet is 0.3 mm thick, for example, seven or more additional thin steel sheets will be necessary to increase the thickness of the rotor core by 2 mm, which causes an increase in the production cost of the rotor core. Even though the rotor is made thicker than the stator, there will be some areas on the stator where the magnetic forces from the rotor act less, which practically increases the cost of the stator. This consequently leads to an increase in the motor cost.

The present invention was made to solve the problems described above and has an object to provide a method for producing a motor rotor, which improves the assembling accuracy of a rotor core consisting of a lamination stack and a shaft, and allows for production of high performance motor rotors at low cost.

Means of Solving the Problems

To achieve the above purpose, one aspect of the invention provides a method for producing a motor rotor configured as below.

(1) In the method for producing a motor rotor, a lamination stack made up of a stack of a plurality of thin steel sheets each formed with a through hole, the lamination stack having a shaft bore formed of the through holes of the thin steel sheets aligned with one another, is retained as a rotor core in a thickness direction of the lamination stack with use of a pair of jigs holding the lamination stack from both sides in the thickness direction, and a shaft is inserted into the shaft bore and joined to the lamination stack by shrink fitting, wherein the pair of jigs each include: a shaft hole for the shaft to pass through; a radially inner peripheral portion for holding a peripheral edge of the shaft bore of the lamination stack at a position, in a radial direction of the shaft hole, surrounding the shaft hole radially inside; and a radially outer peripheral portion located on a radially outer side of the radially inner peripheral portion for holding the outer periphery of the lamination stack, and the radially inner peripheral portion and the radially outer peripheral portion of each of the jigs are positioned at different heights in the jig height direction perpendicular to the radial direction.

In the motor rotor producing method in the above aspect of the invention, the areas designated as the radially inner peripheral portion and the radially outer peripheral portion are defined as follows.

Specifically, referring to a portion located around the middle between the outer peripheral edge and inner peripheral edge in the radial direction of the ring-like lamination stack as a sheet radial center, the radially inner peripheral portion of the pair of jigs is an area located on a more inner side in the radial direction than the sheet radial center of the lamination stack. The radially outer peripheral portion of the pair of jigs is an area located on a more outer side in the radial direction than the sheet radial center of the lamination stack.

(2) In the motor rotor producing method described in (1), preferably, the pair of jigs include either a truncated cone shape that the radially inner peripheral portion is higher than the radially outer peripheral portion toward one side in the jig height direction with reference to a horizontal direction or an inverted truncated cone shape that the radially inner peripheral portion is lower than the radially outer peripheral portion, the pair of jigs being made up of a first jig and a second jig having the same shape, the truncated cone shape or the inverted truncated cone shape.

(3) In the motor rotor producing method described in (2), preferably, the pair of jigs are formed in the truncated cone shape.

(4) In the motor rotor producing method described in any one of (1) to (3), preferably, the pair of jigs are formed so that the radially inner peripheral portions and the radially outer peripheral portions are connected through inclined surfaces.

(5) In the motor rotor producing method described in any one of (1) to (3), preferably, the pair of jigs each have a flat plate-like base connecting the radially inner peripheral portion and the radially outer peripheral portion, and the radially inner peripheral portion and the radially outer peripheral portion are formed to protrude from the base in the jig height direction.

(6) The motor rotor producing method described in any one of (1) to (5) preferably includes: a lamination-stack retaining step of retaining the lamination stack held by the pair of jigs with a predetermined clamping force from both sides of the lamination stack in the thickness direction; a lamination-stack heating step of heating the retained lamination stack after the lamination-stack retaining step; and a shaft shrink-fitting step of, after heating the lamination stack, inserting the shaft into the shaft bore of the lamination stack through the shaft holes of the pair of jigs, and shrink-fitting the shaft and the lamination stack.

Effects of the Invention

The effects achieved by the motor rotor producing method according to the present invention configured as described above will be described below.

In the method for producing a motor rotor according to the aspect described above, a lamination stack made up of a stack of a plurality of thin steel sheets each formed with a through hole, the lamination stack having a shaft bore formed of the through holes of the thin steel sheets aligned with one another, is retained as a rotor core in a thickness direction of the lamination stack with use of a pair of jigs holding the lamination stack from both sides in the thickness direction, and a shaft is inserted into the shaft bore and joined to the lamination stack by shrink fitting, wherein the pair of jigs each include: a shaft hole for the shaft to pass through; a radially inner peripheral portion for holding a peripheral edge of the shaft bore of the lamination stack at a position, in a radial direction of the shaft hole, surrounding the shaft hole radially inside; and a radially outer peripheral portion located on a radially outer side of the radially inner peripheral portion for holding the outer periphery of the lamination stack, and the radially inner peripheral portion and the radially outer peripheral portion of each of the jigs are positioned at different heights in the jig height direction perpendicular to the radial direction. Therefore, the variation range among the products (rotors) in the amount of displacement in the thickness direction of the lamination stack between a shrink fit portion with the shaft and an outermost portion of the stack is reduced to about half of that of a conventional producing method.

Namely, the rotor core consists of the lamination stack, which is made up of a stack of a plurality of thin steel sheets each having a through hole. One thin steel sheet is formed to be about 0.3 mm thick, for example, and have an outer diameter of more than 100 mm, so that it can easily warp in the thickness direction even by its own weight. The through holes of the thin steel sheets are formed before the lamination by punch pressing or the like one by one. The through hole of each thin steel sheet is different in the configuration of its peripheral portion such as inclination of the inner circumferential face (fitting face), thickness of the shear layer, or burrs at the end. Although the plurality of thin steel sheets (lamination stack) are retained in the thickness direction with a pair of jigs during the shrink fitting, there are nearly 300 such thin steel sheets for example. While they are locally clamped with the pair of jigs, the entire surfaces of respective thin steel sheets of the whole lamination stack are not secured to each other but they are merely stacked upon one another. Therefore, each thin steel sheet has a relatively high degree of freedom in respect of deformation.

Accordingly, when the shaft is joined to the thin steel sheets with a shrink-fit allowance as the peripheral portions of the through holes contract radially inward, the shaft cannot be joined uniformly to the peripheral portion of each of the thin steel sheets in the horizontal direction perpendicular to the axial direction of the shaft because (a) each thin steel sheet itself can readily warp, (b) each thin steel sheet is shrink-fitted to the shaft differently due to the difference in the configuration of the peripheral portion of the through hole, and (c) the thin steel sheets have a large degree of freedom of deformation as their surfaces are not entirely secured to one another.

When the rotor core and the shaft are joined together by the conventional producing method, the residual stress after the shrink fitting when the peripheral portion of the through hole of each thin steel sheet contracts toward the shaft causes a strain. As a result, each thin steel sheet undergoes deformation with a displacement between a shrink fit portion of the peripheral portion of the through hole with the shaft and the outer most portions of the thin steel sheet in the thickness direction. Because of the reasons (b) and (c) mentioned above, the rotor (product) can deform toward the entrance side of the shaft bore from which the shaft is inserted into the shaft bore of the lamination stack. Or, the rotor can deform toward the exit side of the shaft bore from which the shaft protrudes from the shaft bore. When the pair of jigs is removed from the lamination stack, the lamination stack as a whole deforms even more in the thickness direction due to the spring back of the respective thin steel sheets toward the entrance side or exit side of the shaft bore, resulting in large variations in the amount and orientation of deformation among the products. As a result, the variation range of deformation among the products is generally large, since, in a rotor core made up of a stack of such deformed thin steel sheets, the variation range is the sum of a displacement on the entrance side of the shaft bore in the thickness direction of the lamination stack, and a displacement on the exit side of the shaft bore.

With the motor rotor producing method according to the aspect described above, the lamination stack is retained with a pair of jigs, with a difference in the jig height direction between the radially inner peripheral portions and the radially outer peripheral portions. The radially inner peripheral portions of the pair of jigs may be made higher, or lower, than the radially outer peripheral portions, and the radially inner peripheral portions and the radially outer peripheral portions have the same positional relationship in the height direction in both jigs.

With a pair of jigs that have radially inner peripheral portions positioned higher than the radially outer peripheral portions, for example, the radially inner peripheral portion of one jig (e.g., upper jig) does not contact and is spaced apart from the periphery of the shaft bore of the lamination stack on one side in the thickness direction (e.g., upper side) of the lamination stack, while the radially inner peripheral portion of the other jig (opposite, or lower jig) directly abuts on the periphery of the shaft bore of the lamination stack on the other side in the thickness direction (opposite, or lower side) of the lamination stack. In this state, after the shaft is inserted from the other side to one side in the thickness direction of the lamination stack, when the peripheral portions of the through holes of the respective thin steel sheets contract to be shrink-fitted to the shaft, no residual stress acts toward the other side in the thickness direction of the lamination stack because of the radially inner peripheral portion of the other jig abutting on the periphery of the shaft bore of the lamination stack, so that there is no deformation toward the other side in the thickness direction of the lamination stack. On the other hand, since the radially inner peripheral portion of one jig is spaced apart from the periphery of the shaft bore of the lamination stack on one side in the thickness direction of the lamination stack, residual stress in each thin steel sheet acts toward one side in the thickness direction of the lamination stack, so that the shrink fit portion of the entire thin steel sheets can readily deform into the gap. Therefore, with the motor rotor producing method according to the aspect described above, as the radially inner peripheral portions and the radially outer peripheral portions have a difference in height, the directions in which the respective retained thin steel sheets can freely deform are reduced to one side (in this case, lower side) in the thickness direction of the lamination stack.

Therefore, with the motor rotor producing method according to the aspect described above, when the pair of jigs are removed from the lamination stack, the thin steel sheets as a whole displace in the same orientation. The variation range, or the overall displacement amount between the shrink fit portion of the shaft bore of the lamination stack (thin steel sheets as a whole) and the shaft, and the outermost portion of the lamination stack, is reduced to about half of the variation range found in the products (rotors) manufactured by the conventional method. This reduces the areas where the magnetic forces act less between the rotor and the stator of the products as compared to the conventional producing method, and improves the assembling accuracy of the rotor core and the shaft, so that there is less loss in generating rotational force in the motor. Motors with better performance can thus be produced.

The thickness of the rotor is increased so that there is no portion where the magnetic forces act less between the rotor and the stator, but less so in a motor having the rotor core with the reduced variation range as mentioned above in the rotor as compared to the one manufactured by the conventional method. The number of additional thin steel sheets is therefore reduced, so that the production cost of the rotor core can be reduced. Moreover, since there is less area where the magnetic forces act less between the rotor and the stator as compared to the one manufactured by the conventional method, the cost of the stator can also be reduced practically, which consequently reduces the cost of the motor.

Accordingly, the motor rotor producing method according to the aspect described above provides the advantageous effects of improving the assembling accuracy of the rotor core and the shaft and enabling production of high performance motor rotors at low cost.

(2) In the method for producing a motor rotor according to the aspect described above as set forth in (1), the pair of jigs include either a truncated cone shape that the radially inner peripheral portion is higher than the radially outer peripheral portion toward one side in the jig height direction with reference to a horizontal direction or an inverted truncated cone shape that the radially inner peripheral portion is lower than the radially outer peripheral portion, the pair of jigs being made up of a first jig and a second jig having the same shape, the truncated cone shape or the inverted truncated cone shape. Thus, the directions in which the thin steel sheets can freely deform are readily controlled, and, distortion toward one side in the thickness direction of the lamination stack is prevented.

(3) In the method for producing a motor rotor according to the aspect described above as set forth in (2), the pair of jigs are formed in the truncated cone shape. Thus, after the shaft is inserted into the shaft bore of the lamination stack toward the upper side of the pair of jigs and shrink-fitted, residual stress hardly acts toward the opposite side of the direction in which the shaft is inserted when the peripheral portions of the through holes of the respective thin steel sheets contract toward the shaft. Distortion of the lamination stack toward this opposite side is thus reliably prevented.

(4) In the method for producing of a motor rotor according to the aspect described above as set forth in any one of (1) to (3), the pair of jigs are formed so that the radially inner peripheral portions and the radially outer peripheral portions are connected through inclined surfaces. Accordingly, even when a variety of rotor cores are to be manufactured with different specifications such as the outer diameter of the thin steel sheets, the pair of jigs having a single specification are not dependent on the specification of the rotor core and can be used universally for a wide variety of rotor cores. As the pair of jigs need not have respective specifications for various rotor cores, a cost reduction of the rotor core is possible.

(5) In the method for producing a motor rotor according to the aspect described above as set forth in any one of (1) to (3), the pair of jigs each have a flat plate-like base connecting the radially inner peripheral portion and the radially outer peripheral portion, and the radially inner peripheral portion and the radially outer peripheral portion are formed to protrude from the base in the jig height direction. Therefore, the radially inner peripheral portion and the radially outer peripheral portion can be set to respective heights in accordance with an amount of displacement that is desired to be restricted in the thickness direction of the lamination stack after it has been shrink-fitted.

(6) The method for producing a motor rotor according to the aspect described above as set forth in any one of (1) to (5) includes a lamination-stack retaining step of retaining the lamination stack held by the pair of jigs with a predetermined clamping force from both sides of the lamination stack in the thickness direction; a lamination-stack heating step of heating the retained lamination stack after the lamination-stack retaining step; and a shaft shrink-fitting step of after heating the lamination stack, inserting the shaft into the shaft bore of the lamination stack through the shaft holes of the pair of jigs, and shrink-fitting the shaft and the lamination stack. In the lamination stack retaining step, the lamination stack is retained with the pair of jigs so that it has less freedom of deformation after the shrink fitting. In the lamination-stack heating step, the shaft bore of the retained lamination stack expands to have a somewhat larger inner diameter by thermal expansion. In the shaft shrink fitting step, the shaft can be smoothly inserted into the shaft bore that has expanded to have a larger bore diameter.

The lamination stack is then cooled, and thus it is shrink-fitted to the shaft. At this time, since the lamination stack is restricted to distort to one side in its thickness direction, the lamination stack, or the rotor core, is joined to the shaft with high assembling accuracy.

DESCRIPTION OF EMBODIMENTS

One embodiment of the present invention will be hereinafter described in detail with reference to the accompanying drawings. This is an embodiment of a producing method of rotors for motors mounted in hybrid cars or the like, wherein a shaft, which is the rotating shaft of the rotor, is inserted into a shaft bore in a rotor core made up of a lamination stack to securely join the shaft with the rotor core.

In this embodiment, a reference symbol "HT" in the accompanying drawings represents a direction along the axial center of the shaft, a direction along the rotating shaft of the rotor, a thickness direction of the rotor core, a stacking direction (thickness direction) of thin steel sheets, a direction along the axis center of a shaft hole of a pair of jigs, and a jig height direction. A reference symbol "RD" represents a radial direction relative to the axial center of the shaft, a radial direction relative to the axial center of the rotor, a radial direction relative to the axial center of the shaft bore in the lamination stack (through holes in thin steel sheets), and a radial direction relative to the axial center of the shaft hole in the pair of jigs.

First, the motor according to this embodiment will generally be described with reference to FIG. 1, FIG. 6, FIG. 7, and FIG. 13.

Figure 1:
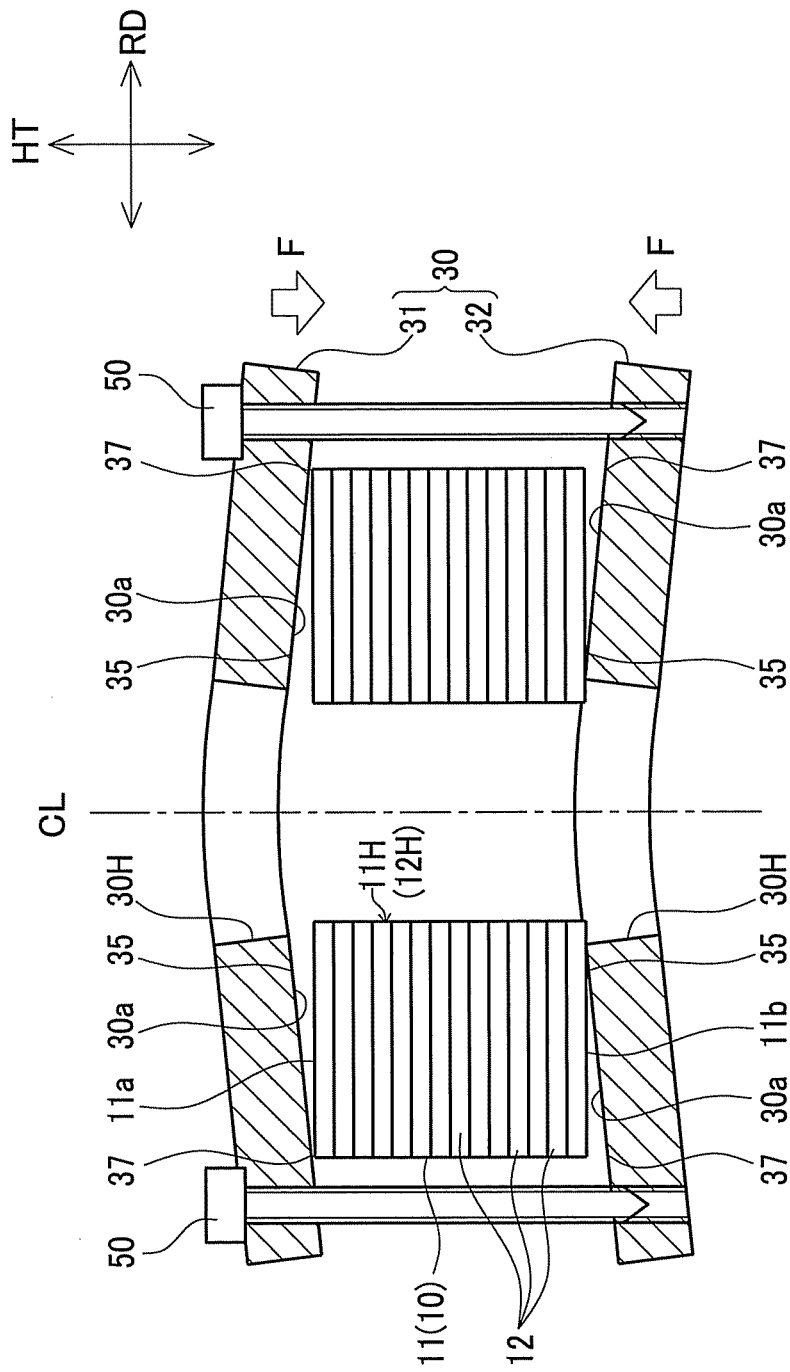
FIG. 1 is a diagram illustrating a producing method for securely joining a rotor core and a shaft with the use of a pair of jigs according to a first example of the embodiment.
Figure 6:
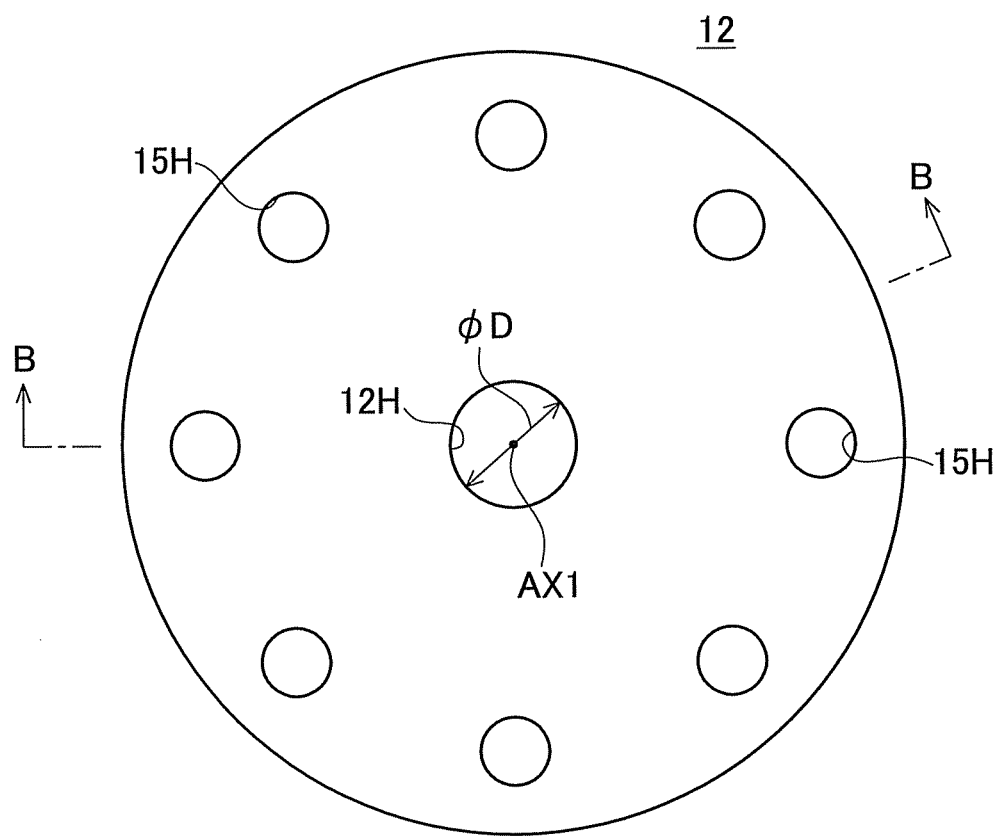
FIG. 6 is a plan view showing a thin steel sheet forming the rotor core.
Figure 7:
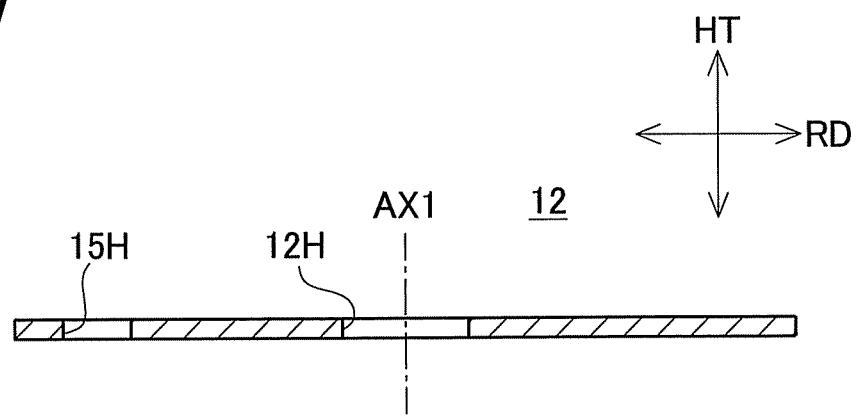
FIG. 7 is a cross-sectional view taken along a line B-B in FIG. 6.
Figure 13:
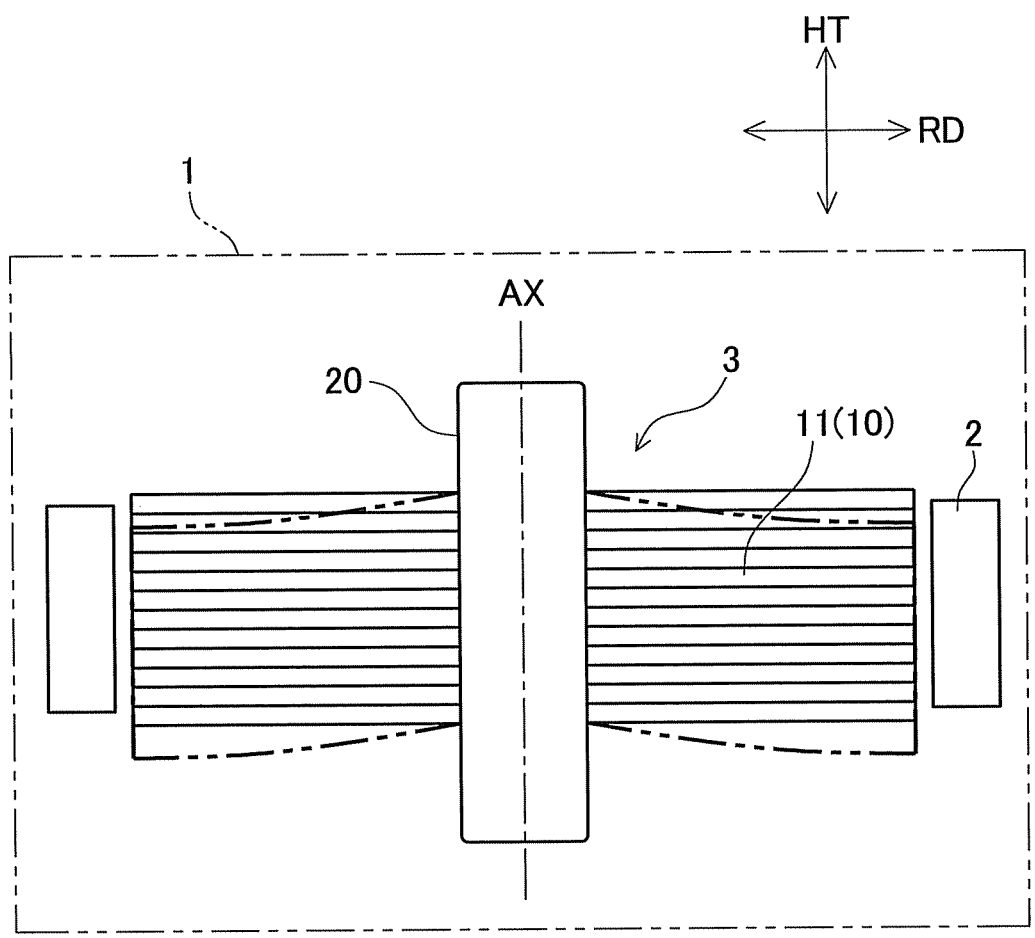
FIG. 13 is a schematic diagram illustrating a motor, with the rotor manufactured by the motor rotor producing method according to the embodiment assembled with the stator.
Figure 14:
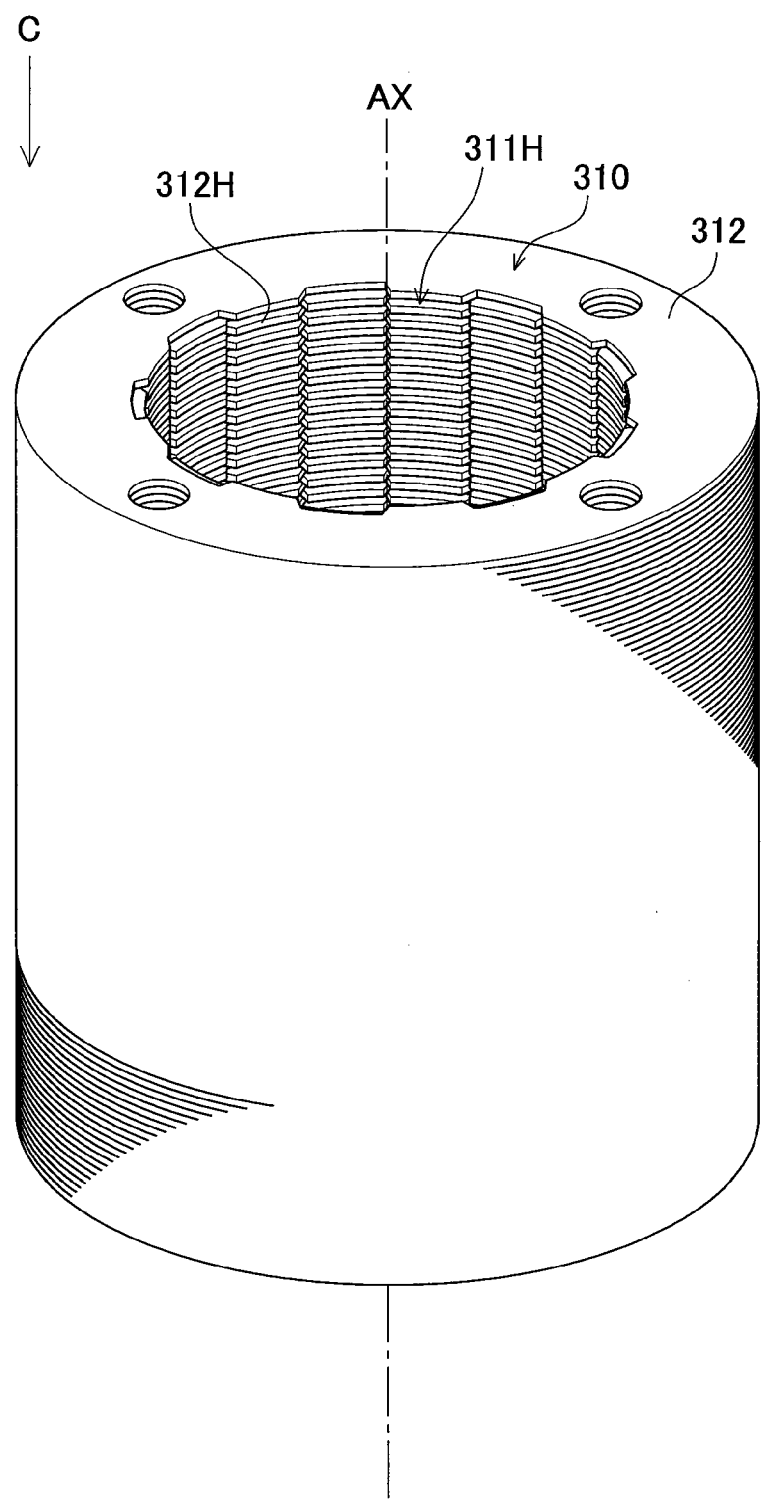
FIG. 14 is a perspective view of the rotor core disclosed in Patent Document 1.
Figure 15:
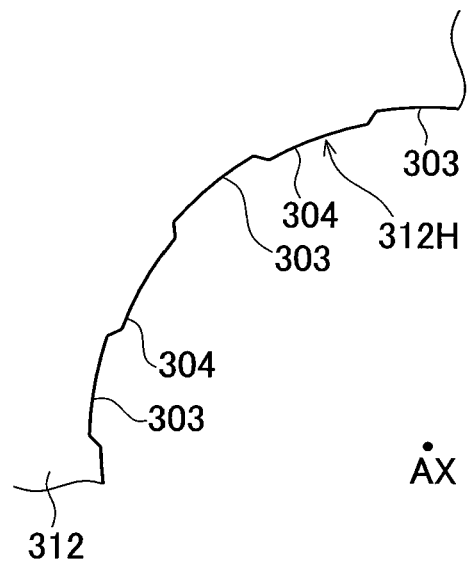
FIG. 15 shows part of a thin steel sheet forming the rotor core as viewed from the direction of an arrow C in FIG. 14.
Figure 16:
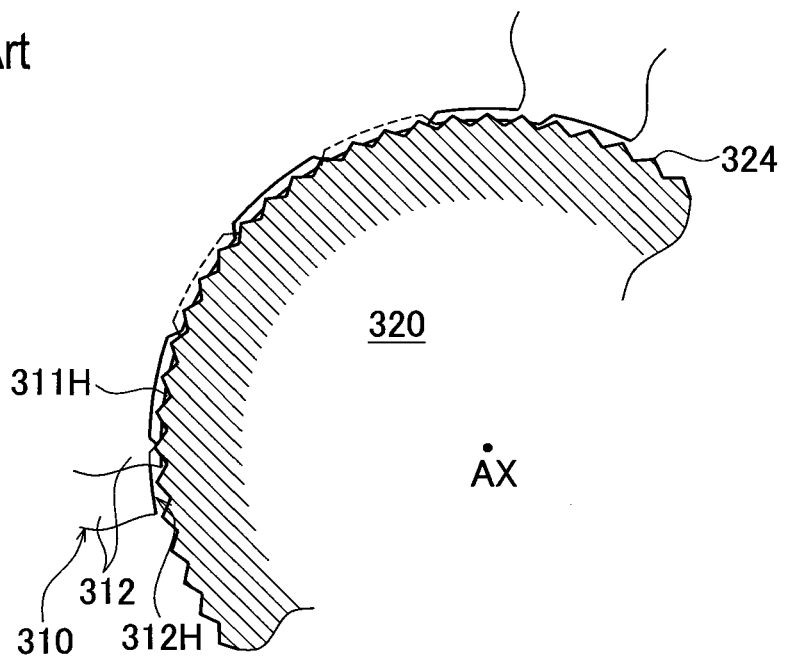
FIG. 16 is a diagram illustrating a condition in which a motor shaft is inserted into a through hole in the rotor core as viewed from the direction of the arrow C in FIG. 14.

FIG. 1 is a diagram illustrating a producing method for securely joining a rotor core and a shaft with the use of a pair of jigs according to a first example of the embodiment. FIG. 6 is a plan view showing a thin steel sheet forming the rotor core. FIG. 7 is a cross-sectional view taken along a line B-B in FIG. 6. FIG. 13 is a schematic diagram illustrating a motor, with the rotor manufactured by the motor rotor producing method according to the embodiment assembled with the stator.

A motor 1 has a stator 2, a rotor 3, and others as shown in FIG. 13. The stator 2 is positioned on the outside of the rotor 3 in the radial direction RD in a ring-like form along the circumference of the rotor 3 around an axial center AX of the rotor 3.

The rotor 3 includes a rotor core 10 and a shaft 20. The rotor core 10 is made up of a lamination stack 11, which is a plurality of (for example about 300) thin steel sheets 12 stacked in the thickness direction HT. The thin steel sheet 12 is formed as a disc having a thickness of 0.3 mm and an outer diameter φ of 130 mm, for example, and has a through hole 12H with an inner diameter φD (0<D) in the center around an axial center AX1. The through hole 12H is formed by punch pressing in each of the thin steel sheets 12.

As shown in FIG. 1, the lamination stack 11 has a shaft bore 11H of an inner diameter φD, which is formed by aligning the axial centers AX1 of a plurality of through holes 12H of the plurality of laminated thin steel sheets 12 with one another.

Each of the thin steel sheets 12 has a plurality of magnet slots 15H (FIG. 6 shows eight of the magnet slots 15H) for mounting magnets on the outside in the radial direction RD of the through hole 12H, arranged along a pitch circle (not shown) of a predetermined diameter around the axial center AX1.

The shaft 20 is a hollow or solid rotating shaft of the rotor 3 having an outer diameter φd (0<d<D). The shaft 20 is inserted into the shaft bore 11H of the lamination stack 11 and securely joined to the lamination stack 11 by shrink fitting, as will be described later. In a producing method of the rotor 3, a pair of jigs 30 are used to hold the lamination stack 11 from both sides in the thickness direction HT when securely joining the shaft 20 and the lamination stack 11.

Figure 2:
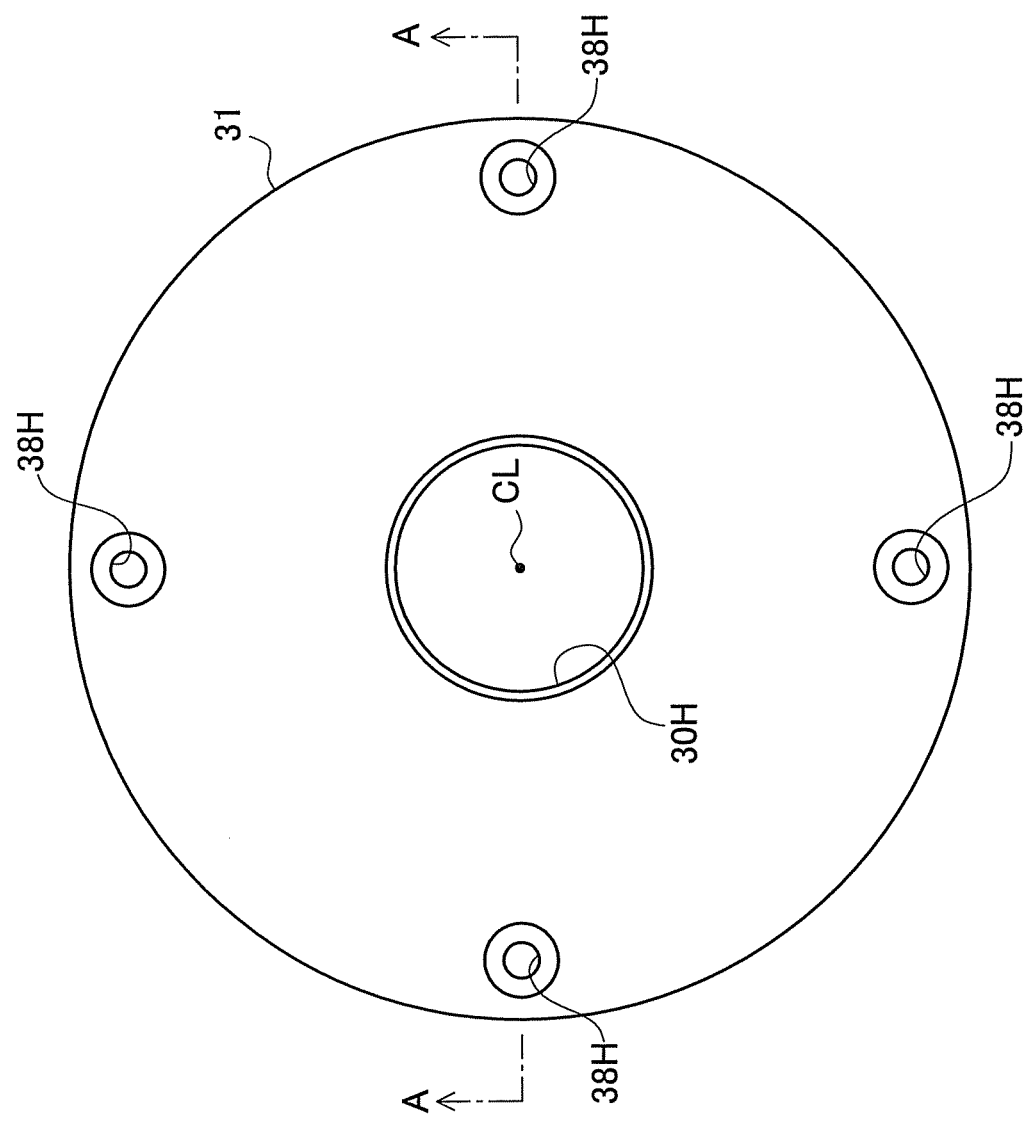
FIG. 2 is a plan view of a first jig of the pair of jigs shown in FIG. 1.

Next, the pair of jigs 30 will be described with reference to FIG. 1 and FIG. 2. FIG. 2 is a plan view of a first jig of the pair of jigs shown in FIG. 1.

The pair of jigs 30 consist of a first jig 31 and a second jig 32 as shown in FIG. 1 and are made of a non-magnetic material such as stainless steel so that they are not heated during the high-frequency quenching for the shrink fitting with the lamination stack 11. The first jig 31 and the second jig 32 each have a shaft hole 30H in the center for the shaft 20 to pass through.

The pair of jigs 30 have radially inner peripheral portions 35 for holding the periphery of the shaft bore 11H of the lamination stack 11 at a position, in the radial direction RD of the shaft hole 30H, surrounding the shaft hole 30H radially inside, and radially outer peripheral portions 37 located on the radially outer side of the radially inner peripheral portions 35 for holding the outer periphery of the lamination stack 11. The radially inner peripheral portion 35 and the radially outer peripheral portion 37 of each of the jigs 30 are positioned at different heights in the jig height direction HT perpendicular to the radial direction RD.

In this embodiment, the areas designated as the radially inner peripheral portion 35 and the radially outer peripheral portion 37 are defined as follows.

Referring to a portion located around the middle between the outer peripheral edge and inner peripheral edge in the radial direction RD of the ring-like lamination stack 11 as a sheet radial center, the radially inner peripheral portion 35 of the pair of jigs 30 is an area located on the more inner side in the radial direction RD than the sheet radial center of the lamination stack 11. The radially outer peripheral portion 37 of the pair of jigs 30 is an area located on the more outer side in the radial direction RD than the sheet radial center of the lamination stack 11.

The pair of jigs 30 have either a truncated cone shape wherein the radially inner peripheral portion 35 is higher than the radially outer peripheral portion 37 toward one side (upper side in FIG. 1) in the jig height direction HT with reference to the horizontal direction, or an inverted truncated cone shape wherein the radially inner peripheral portion 35 is lower than the radially outer peripheral portion 37. The first jig 31 and the second jig 32 of the pair of jigs 30 have the same shape, whether it is the truncated cone shape or the inverted truncated cone shape.

In this embodiment, a plurality of fasteners 50 such as bolts are used to retain the lamination stack 11 held between the first jig 31 and the second jig 32 with a predetermined clamping force F in the thickness direction HT. A plurality of fastener holes 38H are formed at plural (four in FIG. 2) locations in the first jig 31 for the fasteners 50 to pass through, while a plurality of internal threads 39H are formed at plural locations in the second jig 32 to mate with the fasteners 50.

The lamination stack may be retained with the first jig and the second jig by other methods than the one described in this embodiment. The first jig and the second jig may be configured to be able to move closer to or away from each other in the thickness direction by means of a drive power source such as an air cylinder or a hydraulic cylinder in dedicated production equipment, to hold and retain the lamination stack with the thus driven first jig and second jig.

FIRST EXAMPLE

Figure 3:
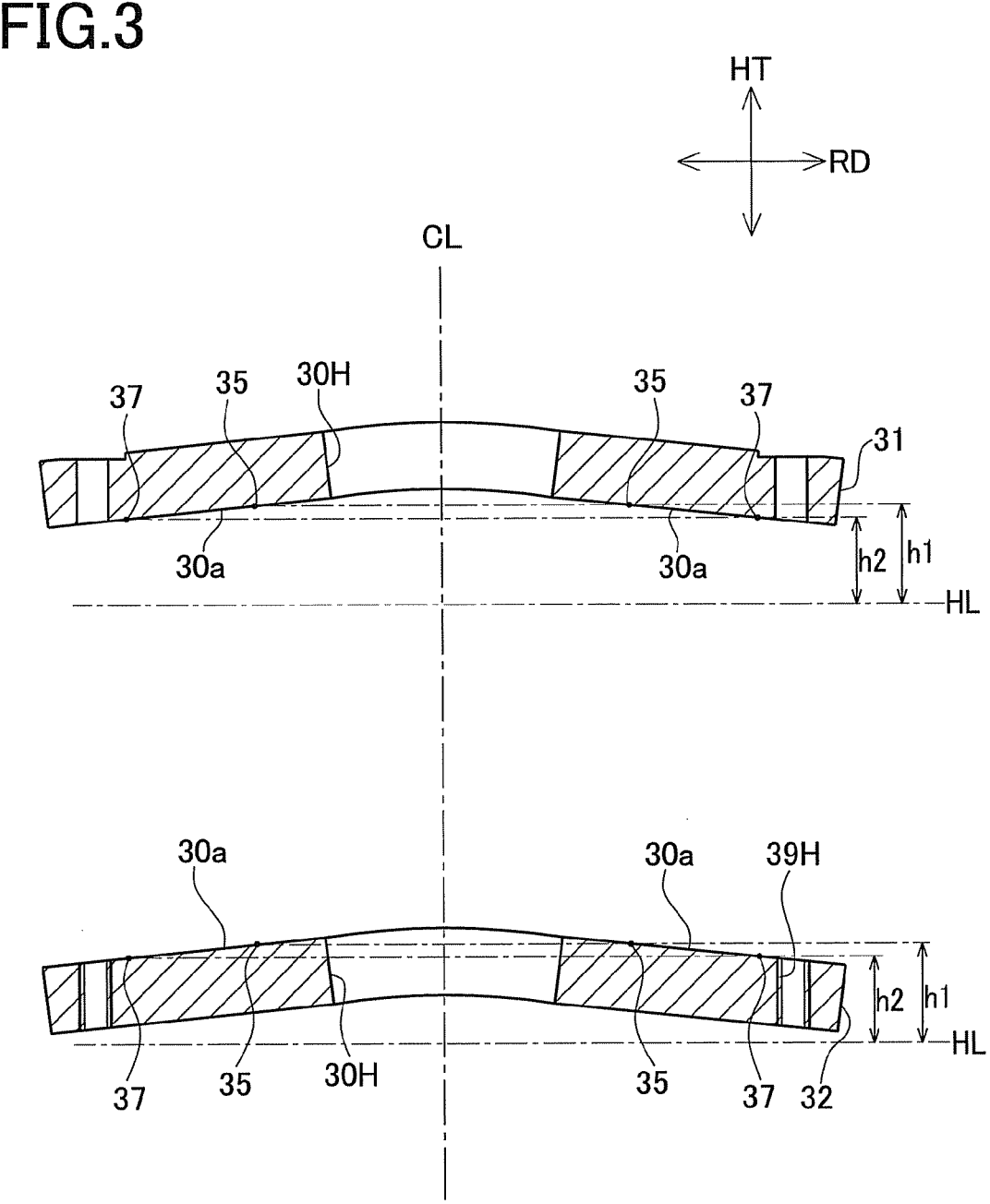
FIG. 3 is a cross-sectional view of the pair of jigs taken along a line A-A in FIG. 2.

The pair of jigs according to a first example of the embodiment will be described with reference to FIG. 1 to FIG. 3. FIG. 3 is a cross-sectional view of the pair of jigs taken along a line A-A in FIG. 2.

In this example, as shown in FIG. 1 to FIG. 3, the pair of jigs 30 have a truncated cone shape wherein the radially inner peripheral portion 35 is higher than the radially outer peripheral portion 37 by an amount h1-h2 relative to the reference horizontal line HL, with an inclined surface 30a connecting the radially inner peripheral portion 35 and the radially outer peripheral portion 37.

More specifically, the first and second jigs 31 and 32 (pair of jigs 30) are each made from a single planar disc bent into a shape wherein the portion near the axial center CL is located highest, from where the height decreases gradually toward the outer side in the radial direction RD of the shaft hole 30H, as shown in FIG. 1 to FIG. 3.

VARIATION EXAMPLE

The pair of jigs according to the first example is each made from a single planar disc deformed into a truncated cone shape. In one variation example, a pair of jigs 30T may be formed by machining or the like instead of deforming a single component such that a radially inner peripheral portion 35T is higher than a radially outer peripheral portion 37T by an amount (h1-h2).

Figure 4:
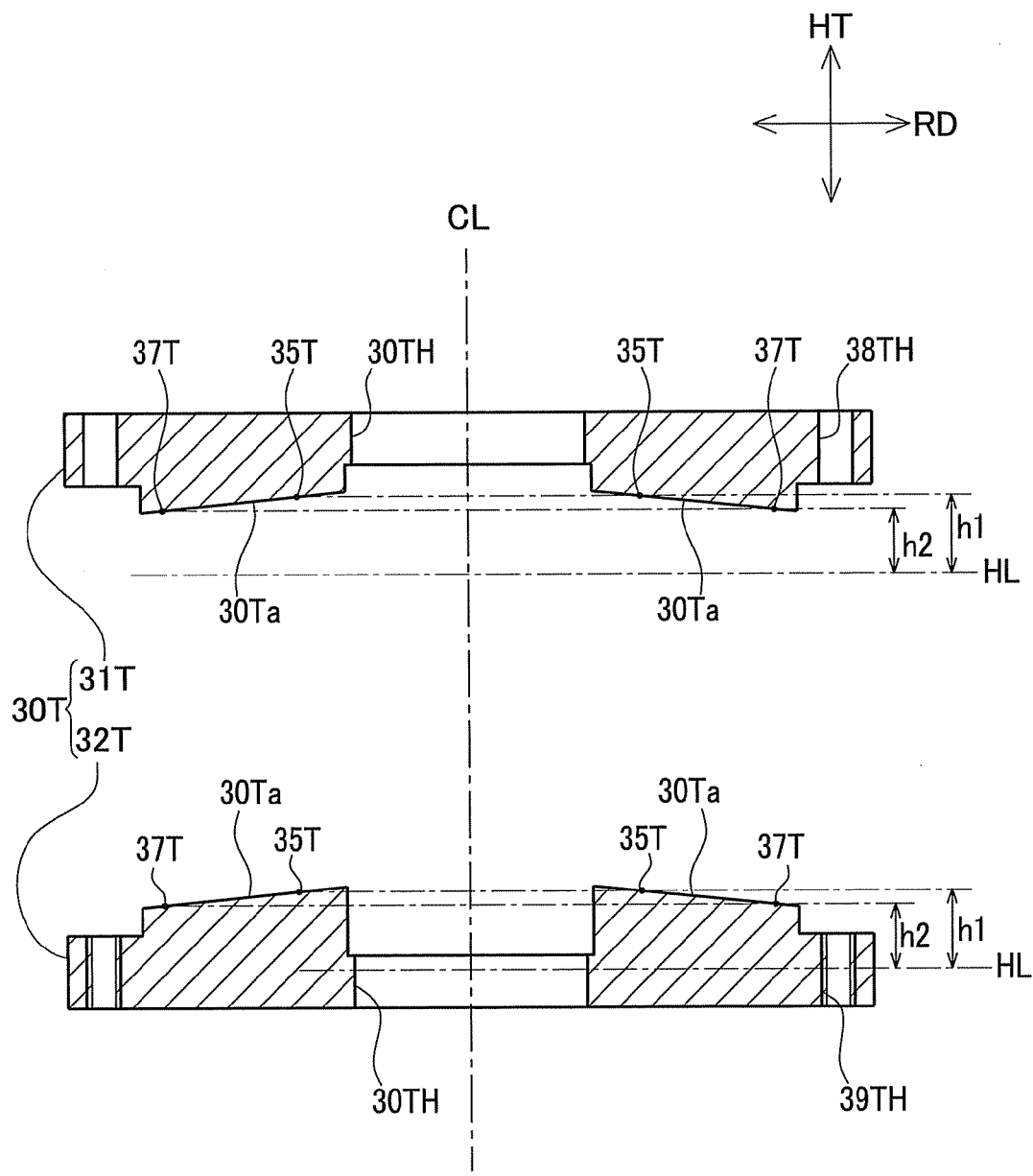
FIG. 4 is a cross-sectional view illustrating the pair of jigs according to a variation example of the embodiment, seen from the same position as FIG. 3.

FIG. 4 is a diagram illustrating a pair of jigs according to the variation example, which is a cross-sectional view seen from the same position as FIG. 3.

In this variation example, as shown in FIG. 4, the pair of jigs 30T have a truncated cone shape wherein the radially inner peripheral portion 35T is higher than the radially outer peripheral portion 37T by an amount (h1-h2) relative to the reference horizontal line HL, with an inclined surface 30Ta connecting the radially inner peripheral portion 35T and the radially outer peripheral portion 37T. A plurality of fastener holes 38TH are formed through the first jig 31T at plural locations for the fasteners 50 to pass through, while a plurality of internal threads 39TH are formed at plural locations in the second jig 32T to threadedly engage with the fasteners 50.

Next, the motor rotor producing method according to this embodiment will be described with reference to FIG. 8 to FIG. 10.

Figure 8:
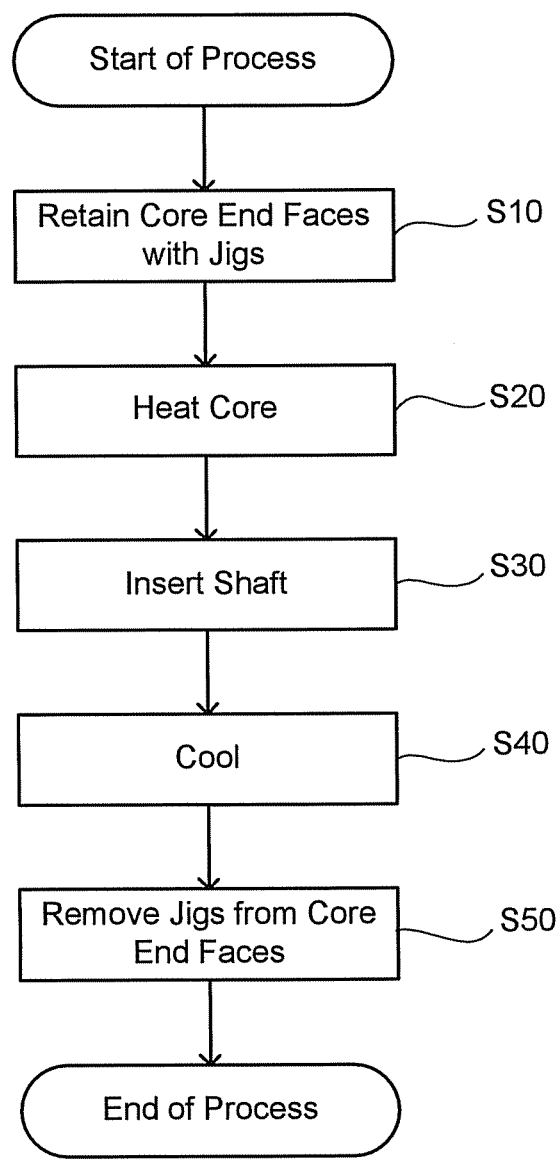
FIG. 8 is a flowchart showing the process steps of producing a motor rotor in the embodiment.

FIG. 8 is a flowchart showing the steps of producing the motor rotor in the embodiment. FIG. 9 is a schematic diagram for explaining a state before the shaft inserted into the shaft bore is shrink-fitted to the lamination stack. FIG. 10 is a schematic diagram for explaining a state after the shaft inserted into the shaft bore is shrink-fitted to the lamination stack.

Figure 9:
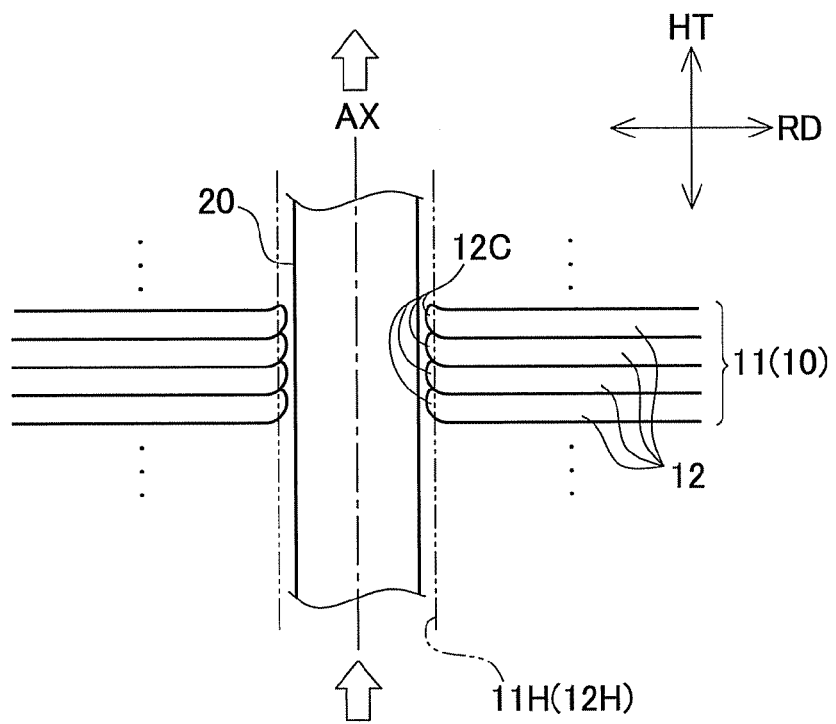
FIG. 9 is a schematic diagram for explaining a state before the shaft inserted into a shaft bore is shrink-fitted to a lamination stack.

First, as shown in FIG. 9, the lamination stack 11 is a stack of a predetermined number of thin steel sheets 12 oriented in the same punching direction and united as one-piece rotor core 10, and has a shaft bore 11H that is formed by aligning a plurality of through holes 12H of the respective thin steel sheets 12 with one another.

At Step S10, a lamination-stack retaining step of the motor rotor producing method of this embodiment is carried out. In this lamination-stack retaining step, the lamination stack 11 held by the pair of jigs 30 is retained with a predetermined clamping force F from both sides in the thickness direction HT of the lamination stack 11. More specifically, on one side (upper side in FIG. 1) in the thickness direction HT of the lamination stack 11, an inner peripheral portion of one end face 11a of the lamination stack 11 near the edge of the shaft bore 11H does not contact the radially inner peripheral portion 35 of the first jig 31 and there is a gap there as shown in FIG. 1. An outer peripheral portion near the radially outermost end of the lamination stack 11 is in contact with the radially outer peripheral portion 37 of the first jig 31 and there is no gap there. On the other side (lower side in FIG. 1) in the thickness direction HT, an inner peripheral portion of the other end face 11b is in contact with the radially inner peripheral portion 35 of the second jig 32 and there is no gap there, while an outer peripheral portion does not contact the radially outer peripheral portion 37 of the second jig 32 and there is a gap there. The lamination stack 11 is held between the first jig 31 and the second jig 32 in this way, and, with four fasteners 50 passed through the fastener holes 38H of the first jig 31 and fastened into the internal threads 39H of the second jig 32, the lamination stack 11 is retained with a clamping force F of a predetermined level of about 1 ton, for example.

Next, at Step S20, a lamination-stack heating step of the motor rotor producing method of to this embodiment is carried out. In this lamination-stack heating step, after the lamination-stack retaining step at Step S10, the retained lamination stack 11 is heated. More specifically, the lamination stack 11 retained with the pair of jigs 30 is heated to nearly about 300° C. by high-frequency quenching, for example, to expand the inner diameter $\phi D$ of the shaft hole 11H by about 100 µm by thermal expansion.

Next, at Step S30 and Step S40, a shaft shrink-fitting step of the motor rotor producing method of this embodiment is carried out. In this shaft shrink-fitting step, after heating the lamination stack 11, the shaft 20 is inserted into the shaft bore 11H of the lamination stack 11 through the shaft holes 30H of the pair of jigs 30, and shrink-fitted to the lamination stack 11.

More specifically, at Step S30, the shaft 20 is inserted from the shaft hole 30H of the second jig 32, through the shaft bore 11H of the lamination stack 11 retained with the pair of jigs 30, and through the shaft hole 30H of the first jig 31, as shown in FIG. 1. Since the inner diameter $\phi D$ of the shaft bore 11H has been increased by thermal expansion, the shaft 20 having an outer diameter $\phi d$ (0<d<D) can be inserted smoothly into the enlarged shaft bore 11H as shown in FIG. 9.

At Step S40, the lamination stack 11 is cooled. Thereby, the through holes 12H of the plurality of stacked thin steel sheets 12 (shaft bore 11H of the lamination stack 11) contract to have an inner diameter $\phi D$ smaller than the outer diameter $\phi d$ of the shaft 20, so that the lamination stack 11 and the shaft 20 are securely joined by shrink fitting as shown in FIG. 10.

Next, at Step S50, the fasteners 50 are loosened to remove the pair of jigs 30 from the lamination stack 11, and then magnets inserted into the respective magnet slots 15H are securely attached to the lamination stack 11 with an adhesive. The process of securely joining the rotor core 10 and the shaft 20 is thus completed.

The effects of the motor rotor producing method according to the first example of the embodiment having the structure as described above will be described below with reference to FIG. 11 to FIG. 13 and FIG. 17 to FIG. 20.

Figure 11:
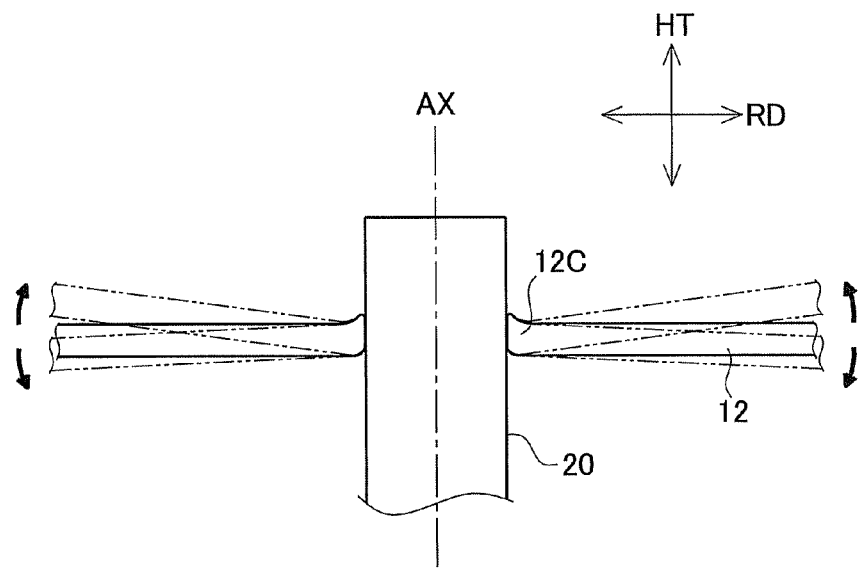
FIG. 11 is a schematic diagram for explaining how the thin steel sheet is distorted in a shrink fit portion with the shaft.
Figure 12:
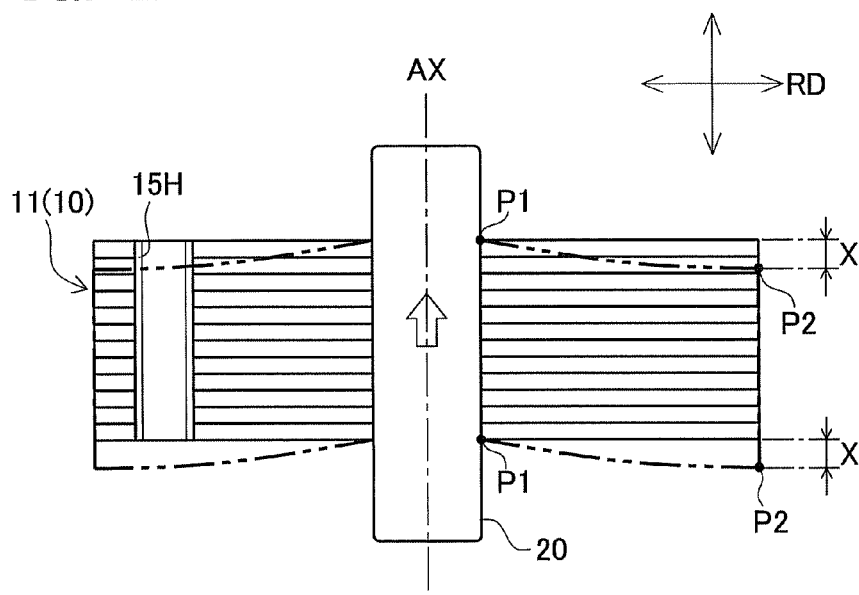
FIG. 12 is a schematic diagram for explaining how the lamination stack is deformed in the rotor manufactured by the motor rotor producing method according to the embodiment.

FIG. 11 is a schematic diagram for explaining how the thin steel sheet is distorted in the shrink fit portion with the shaft. FIG. 12 is a schematic diagram for explaining how the lamination stack is deformed in the rotor produced by the motor rotor producing method of the embodiment.

In the motor rotor producing method of the first example of the embodiment, the lamination stack 11 made up of a stack of a plurality of thin steel sheets 12 with through holes 12H, and having the shaft bore 11H that is formed by aligning the through holes 12H of the respective thin steel sheets 12 with one another, is retained in the thickness direction HT with the use of a pair of jigs 30 holding the lamination stack 11 from both sides in the thickness direction HT, and the shaft 20 is inserted into the shaft bore 11H of the lamination stack 11 as the rotor core 10, and securely joined to the lamination stack 11 by shrink fitting. The method for producing the rotor 3 for the motor 1 is characterized in that, the pair of jigs 30 each have a shaft hole 30H for the shaft 20 to pass through, a radially inner peripheral portion 35 for holding the periphery of the shaft bore 11H of the lamination stack 11 at a position, in the radial direction RD of the shaft hole 30H, surrounding the shaft hole 30H radially inside, and a radially outer peripheral portion 37 located on the radially outer side of the radially inner peripheral portion 35 for holding the outer periphery of the lamination stack 11, and that the radially inner peripheral portions 35 and the radially outer peripheral portions 37 of the pair of jigs 30 are positioned at different heights in the jig height direction HT perpendicular to the radial direction RD. Therefore, the variation range among the products (rotors 3) in the amount of displacement X in the thickness direction HT of the lamination stack 11 between the shrink fit portion P1 with the shaft 20 and an outermost portion P2 of the stack is reduced to about half of that of the rotor core 410 and the shaft 420 joined together by a conventional producing method as shown in FIG. 17.

Namely, the rotor core 10 is made up of a stack of a plurality of thin steel sheets 12 each having a through hole 12H. One thin steel sheet 12 is formed to be about 0.3 mm thick, for example, and have an outer diameter of more than 100 mm, as shown in FIG. 6 and FIG. 7, so that it can easily warp in the thickness direction even by its own weight. The through holes 12H of the thin steel sheets 12 are formed before the lamination by means of a punch press or the like one by one. Strictly speaking, the through hole 12H of each thin steel sheet 12 is different in the configuration of a peripheral portion 12C such as inclination of the inner circumferential face (fitting face), thickness of the shear layer, or burrs at the end, as shown in FIG. 9. Although the plurality of thin steel sheets 12 (lamination stack 11) are retained in the thickness direction HT with a pair of jigs during the shrink fitting, there are nearly 300 such thin steel sheets as mentioned above. While they are locally clamped with the pair of jigs, the entire surfaces of respective thin steel sheets 12 of the whole lamination stack 11 are not secured to each other but they are merely stacked upon one another. Therefore, each thin steel sheet 12 has a relatively high degree of freedom in respect of deformation, as shown in FIG. 11.

Figure 10:
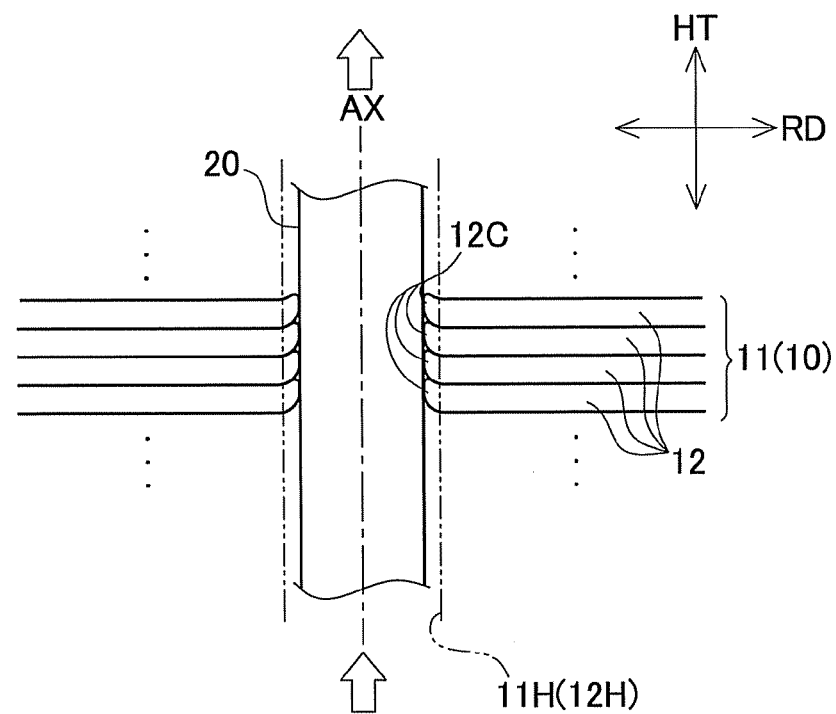
FIG. 10 is a schematic diagram for explaining a state after the shaft inserted into the shaft bore is shrink-fitted to the lamination stack.

Accordingly, when the shaft 20 is joined to the thin steel sheets with a shrink-fit allowance as shown in FIG. 10 as the peripheral portions 12C of the through holes 12H contract inward in the radial direction RD, the shaft 70 cannot be joined uniformly to the peripheral portion 12C of each of the thin steel sheets 12 in the horizontal direction perpendicular to the axial direction HT of the shaft 20 (direction parallel to the radial direction RD in FIG. 10 to FIG. 13, FIG. 18, and FIG. 19) because (a) each thin steel sheet 12 itself can readily warp, (b) each thin steel sheet 12 is shrink-fitted to the shaft 20 differently due to the difference in the configuration of, in particular, the peripheral portion 12C of the through hole, and (c) the thin steel sheets 12 have a large degree of freedom of deformation as their surfaces are not entirely secured to one another.

Figure 17:
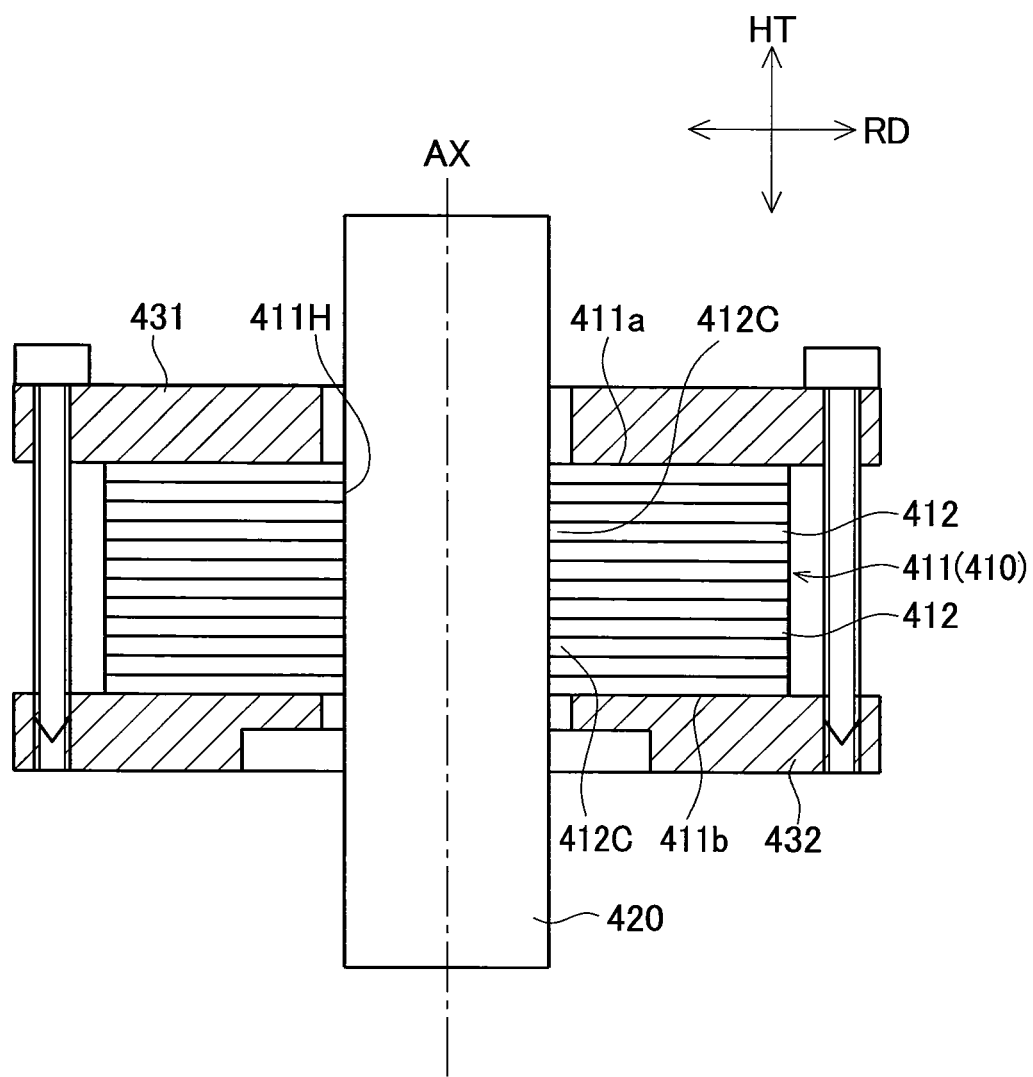
FIG. 17 is a diagram for explaining a conventional producing method of securely joining a rotor core and a shaft.
Figure 18:
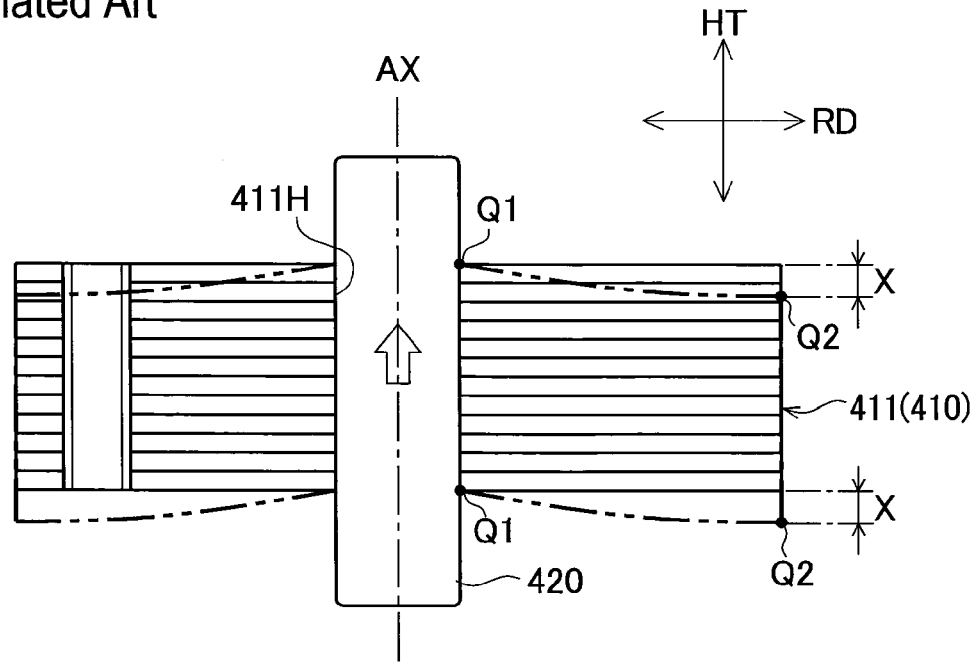
FIG. 18 is a schematic diagram illustrating how a lamination stack is deformed toward a shaft entrance side in an axial direction in a rotor manufactured by the conventional producing method shown in FIG. 17.
Figure 19:
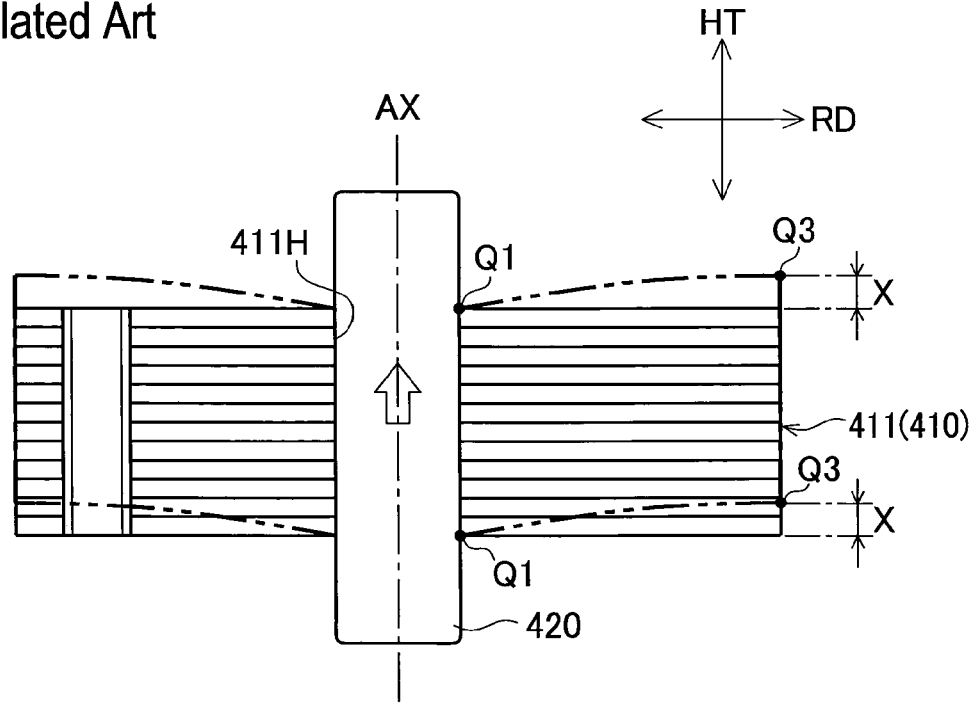
FIG. 19 is a schematic diagram illustrating how the lamination stack is deformed toward a shaft exit side in the axial direction in the rotor manufactured by the conventional producing method shown in FIG. 17.

When the rotor core 410 and the shaft 420 are joined together by the conventional producing method shown in FIG. 17, the residual stress after the shrink fitting when the peripheral portion 412C of the through hole of each thin steel sheet 412 contracts toward the shaft 420 causes a large strain. As a result, as shown in FIG. 18 and FIG. 19, each thin steel sheet 412 undergoes deformation with a displacement X (0<X) between the shrink fit portion Q1 of the peripheral portion 412C of the through hole with the shaft 420 and the outermost portions Q2 and Q3 of the thin steel sheet in the thickness direction HT. Because of the reasons (b) and (c) mentioned above, the rotor (product) can deform toward the entrance side of the shaft bore (lower side in FIG. 18) from which the shaft 420 is inserted into the shaft bore 411H of the lamination stack 410 as shown in FIG. 18. Or, the rotor can deform toward the exit side of the shaft bore (upper side in FIG. 19) from which the shaft 420 protrudes from the shaft bore 411H.

When the first jig 431 and the second jig 432 are removed from the lamination stack 411, the lamination stack 411 as a whole deforms even more in the thickness direction HT due to the spring back of the respective thin steel sheets 412 toward the entrance side or exit side of the shaft bore, resulting in large variations in the amount and orientation of deformation among the products. As a result, the variation range of deformation among the products is generally large, since, in a rotor core made up of a stack of such deformed thin steel sheets 412, the variation range is the sum of a displacement X on the entrance side of the shaft bore in the thickness direction of the lamination stack 411, and a displacement X on the exit side of the shaft bore.

With the producing method of a motor rotor according to the first example of the embodiment, the lamination stack 11 is retained with a pair of jigs 30, with a difference in the jig height direction HT between the radially inner peripheral portions 35 and the radially outer peripheral portions 37. In this embodiment, the radially inner peripheral portions 35 of the pair of jigs 30 are made higher than the radially outer peripheral portions 37, and the radially inner peripheral portions 35 and the radially outer peripheral portions 37 have the same positional relationship in the height direction in both first jig 31 and second jig 32.

With a pair of jigs 30 that have radially inner peripheral portions 35 positioned higher than the radially outer peripheral portions 37 as in this embodiment, the radially inner peripheral portion 35 of the first jig 31 does not contact and is spaced apart from the periphery of the shaft bore 11H of the lamination stack 11 on one side in the thickness direction HT (upper side in FIG. 1) of the lamination stack 11, while the radially inner peripheral portion 35 of the second jig 32 directly abuts on the periphery of the shaft bore 1111 of the lamination stack 11 on the other side in the thickness direction HT (lower side in FIG. 1) of the lamination stack 11.

In this state, after the shaft 20 is inserted from the other side to one side in the thickness direction HT of the lamination stack 11, when the peripheral portions 12C of the through holes of the respective thin steel sheets 12 (lamination stack 11) contract to be shrink-fitted to the shaft 20, no residual stress acts toward the other side in the thickness direction HT of the lamination stack 11 because of the radially inner peripheral portion 35 of the second jig 32 abutting on the periphery of the shaft bore 11H of the lamination stack 11, so that there is no deformation toward the other side in the thickness direction HT of the lamination stack 11. On the other hand, since the radially inner peripheral portion 35 of the first jig 31 is spaced apart from the periphery of the shaft bore 11H of the lamination stack 11 on one side in the thickness direction HT of the lamination stack 11, residual stress in each thin steel sheet 12 acts toward one side in the thickness direction HT of the lamination stack 11, so that the shrink fit portion P1 of the entire thin steel sheets (lamination stack 11) can readily deform into the gap. Therefore, with the motor rotor producing method according to the first example of the embodiment, as the radially inner peripheral portions 35 and the radially outer peripheral portions 37 have a difference in height, the directions in which the respective retained thin steel sheets 12 can freely deform are reduced to one side in the thickness direction HT (the side shown in FIG. 12) of the lamination stack 11.

Therefore, with the producing method of a rotor 3 for a motor 1 according to the first example of the embodiment, when the pair of jigs 30 are removed from the lamination stack 11, the thin steel sheets 12 as a whole (lamination stack 11) deform within the variation range of X as shown in FIG. 12, each displacing in the same orientation by an amount of displacement X. The variation range X, or the overall displacement amount between the shrink fit portion P1 between the shaft bore 11H of the lamination stack 11 (shaft bore 12H of the thin steel sheets 12 as a whole) and the shaft 20, and the outermost portion P2 of the lamination stack 11, is reduced to about half of the variation range 2X found in the conventional producing method. This reduces the areas where the magnetic forces act less between the rotor 3 and the stator 2 of the products as compared to the conventional producing method, and improves the assembling accuracy of the rotor core 10 and the shaft 20, so that there is less loss in generating rotational force in the motor 1. Motors 1 with better performance can thus be produced.

Figure 20:
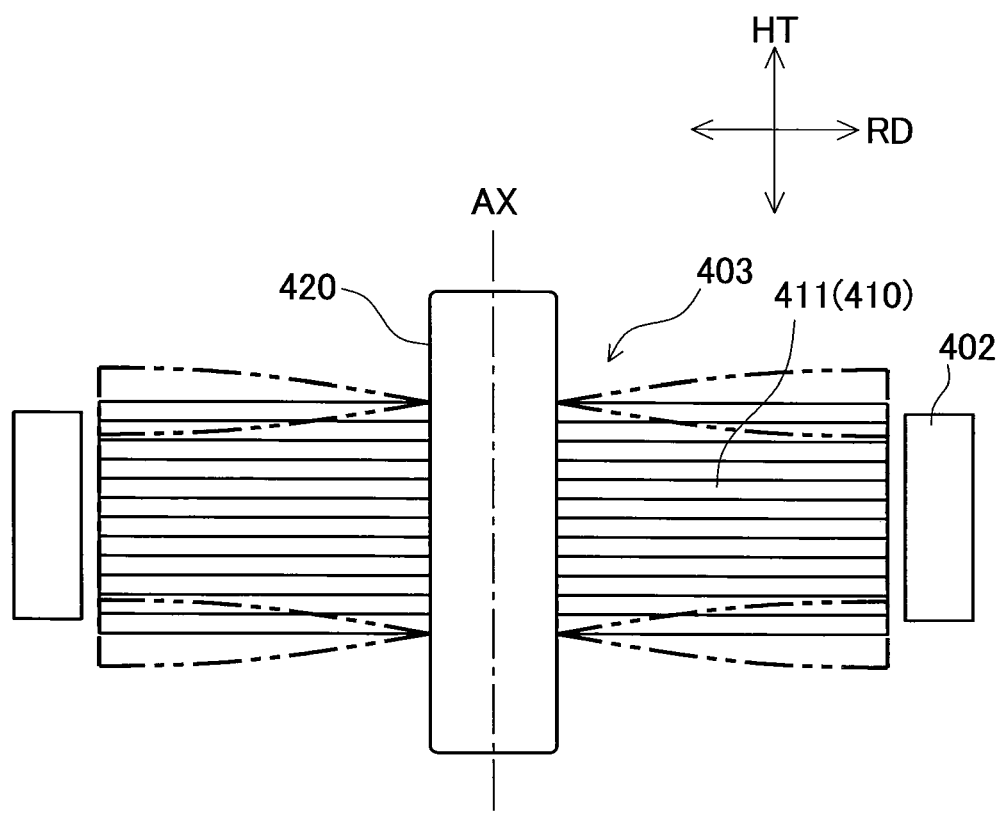
FIG. 20 is a schematic diagram illustrating a motor having the rotor manufactured by the conventional producing method shown in FIG. 17 assembled with the stator.

The thickness of the rotor 3 is increased so that there is no portion where the magnetic forces act less between the rotor and the stator 2, but less so in a motor 1 having the rotor core 10 with the reduced variation range X as mentioned above in the rotor 3 as compared to the one manufactured by the conventional method as shown in FIG. 13 and FIG. 20. The number of additional thin steel sheets 12 is therefore reduced, so that the production cost of the rotor core 10 can be reduced. Moreover, since there is less area where the magnetic forces act less between the rotor 3 and the stator 2 as compared to the one manufactured by the conventional method, the cost of the stator 2 can also be reduced practically, which consequently reduces the cost of the motor 1.

Accordingly, the producing method of a rotor 3 for a motor 1 according to the first example of the embodiment provides the advantageous effects of improving the assembling accuracy of the rotor core 10 and the shaft 20 and enabling production of high performance rotors 3 for motors 1 at low cost.

In the method for producing the rotor 3 for the motor 1 according to the first example of the embodiment, the pair of jigs 30 have either a truncated cone shape that the radially inner peripheral portion 35 is higher than the radially outer peripheral portion 37 toward one side in the jig height direction HT with reference to the horizontal direction HL or an inverted truncated cone shape that the radially inner peripheral portion 35 is lower than the radially outer peripheral portion 37, the first jig 31 and the second jig 32 of the pair of jigs 30 having the same shape, whether it is the truncated cone shape or the inverted truncated cone shape. Thus, the directions in which the thin steel sheets 12 can freely deform are readily controlled, and, as shown in FIG. 12, distortion toward one side in the thickness direction HT (upper side in FIG. 12, the side shown in FIG. 19) of the lamination stack 11 is prevented.

In the method for producing the rotor 3 for the motor 1 according to the first example of the embodiment, the pair of jigs 30 are formed in the truncated cone shape. Thus, after the shaft 20 is inserted into the shaft bore 11H of the lamination stack 11 toward the upper side of the pair of jigs 30 and shrink-fitted, residual stress hardly acts toward the opposite side of the direction in which the shaft 20 is inserted when the peripheral portions 12C of the through holes of the respective thin steel sheets 12 contract toward the shaft 20. Distortion of the lamination stack 11 toward this opposite side is thus reliably prevented.

In the method for producing the rotor 3 for the motor 1 according to the first example of the embodiment, the radially inner peripheral portions 35 and the radially outer peripheral portions 37 of the pair of jigs 30 are connected through the inclined surfaces 30a. Accordingly, even when a variety of rotor cores 10 are to be manufactured with different specifications such as the outer diameter of the thin steel sheets 12, the pair of jigs 30 having a single specification are not dependent on the specification of the rotor core 10 and can be used universally for a wide variety of rotor cores 10. As the pair of jigs 30 need not have respective specifications for various rotor cores 10, a cost reduction of the rotor core 10 is possible.

The method for producing the rotor 3 for the motor 1 according to the first example of the embodiment includes the lamination-stack retaining step of retaining the lamination stack 11 held by the pair of jigs 30 with a predetermined clamping force F from both sides of the lamination stack 11 in the thickness direction HT; the lamination-stack heating step of heating the lamination stack 11 after the lamination-stack retaining step; and the shaft shrink-fitting step of, after heating the lamination stack 11, inserting the shaft 20 into the shaft bore 11H of the lamination stack 11 through the shaft holes 30H of the pair of jigs 30, and shrink-fitting the shaft and the lamination stack 11. In the lamination-stack retaining step, the lamination stack 11 is retained with the pair of jigs 30 so that it has less freedom of deformation after the shrink fitting. In the lamination-stack heating step, the shaft bore 11H of the retained lamination stack 11 expands to have a somewhat larger inner diameter ϕD by thermal expansion. In the shaft shrink fitting step, the shaft 20 can be smoothly inserted into the shaft bore 11H that has expanded to have a larger bore diameter. When the lamination stack 11 is cooled, it is shrink-fitted to the shaft 20. At this time, since the lamination stack 11 is restricted to distort to one side (upper side in FIG. 12) in its thickness direction HT, the lamination stack 11, or the rotor core 10, is joined to the shaft 20 with high assembling accuracy.

SECOND EXAMPLE

Figure 5:
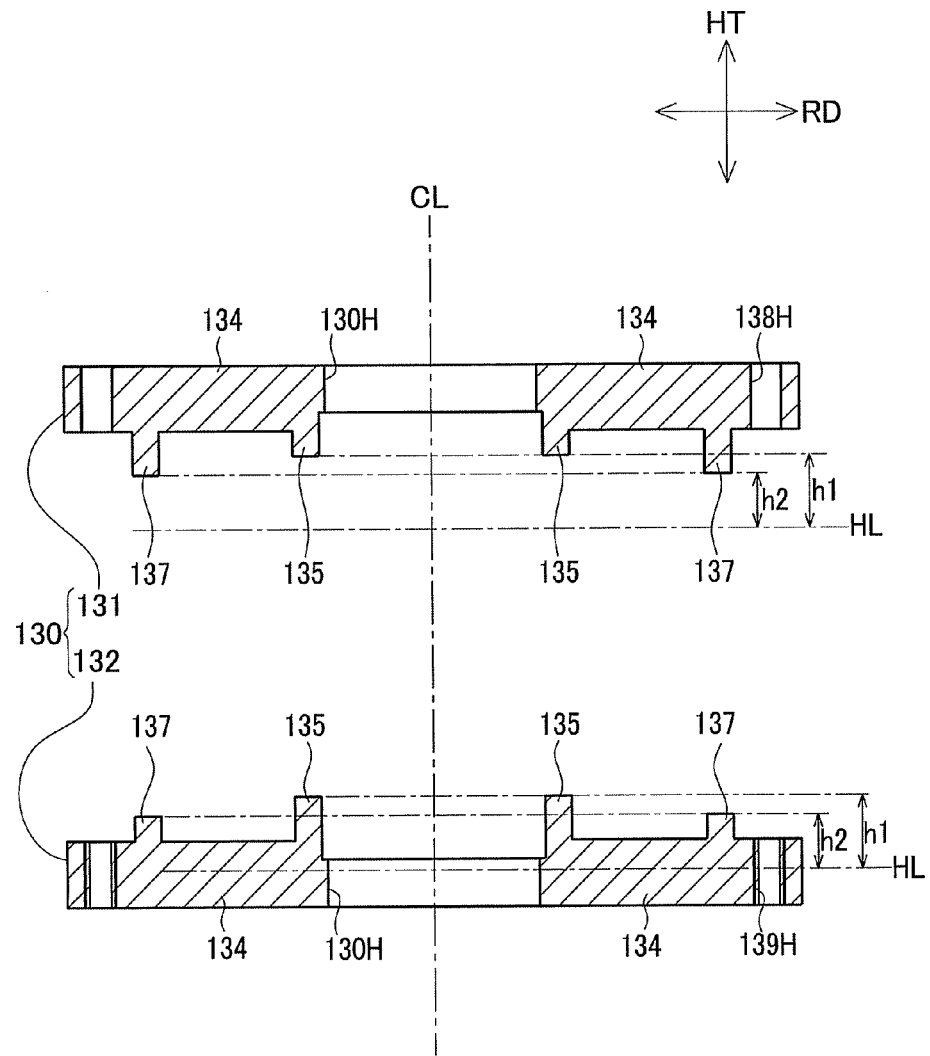
FIG. 5 is a cross-sectional view illustrating the pair of jigs according to a second example of the embodiment, seen from the same position as FIG. 3.

Next, the motor rotor producing method according to a second example of the embodiment will be described with reference to FIG. 5. FIG. 5 is a cross-sectional view seen from the same position as FIG. 3 illustrating the pair of jigs according to the second example of the embodiment.

In this example, the pair of jigs have a different shape from that of the pair of jigs used in the motor rotor producing method of the first example, and other parts are the same as those of the first example. Different parts from the first example will be described mainly, and description of other parts will be simplified or omitted.

In this example, the pair of jigs 130 each have a flat plate-like base 134 that connects a radially inner peripheral portion 135 and a radially outer peripheral portion 137 as shown in FIG. 5. The radially inner peripheral portion 135 and the radially outer peripheral portion 137 each protrude from the base 134 in the jig height direction HT. The pair of jigs 130 have a truncated cone shape wherein the radially inner peripheral portion 135 is higher by an amount (h1-h2) than the radially outer peripheral portion 137 relative to the reference horizontal line HL. A first jig 131 has a shaft hole 130H for the shaft 20 to pass through, and fastener holes 138H for the fasteners 50 shown in FIG. 1 to pass through formed at a plurality of locations. A second jig 132 has a shaft hole 130H for the shaft 20 to pass through, and internal threads 139H to mate with the fasteners 50.

The effects of the motor rotor producing method according to the second example of the embodiment having the structure as described above will be described below.

In the motor rotor producing method according to the second example of the embodiment, similarly to the motor rotor producing method according to the first example described above, the lamination stack 11 made up of a stack of a plurality of thin steel sheets 12 with through holes 12H, and having the shaft bore 11H that is formed by aligning the through holes 12H of the respective thin steel sheets 12 with one another, is retained with the use of a pair of jigs 130 holding the lamination stack 11 from both sides in the thickness direction HT, and the shaft 20 is inserted into the shaft bore 11H of the lamination stack 11 as the rotor core 10, and securely joined to the lamination stack 11 by shrink fitting. The method for producing rotor 3 of the motor 1 is characterized in that, the pair of jigs 130 each have a shaft hole 130H for the shaft 20 to pass through, a radially inner peripheral portion 135 for holding the periphery of the shaft bore 11H of the lamination stack 11 at a position, in the radial direction RD of the shaft hole 130H, surrounding the shaft hole 130H radially inside, and a radially outer peripheral portion 137 located on the radially outer side of the radially inner peripheral portion 135 for holding the outer periphery of the lamination stack 11, and that the radially inner peripheral portions 135 and the radially outer peripheral portions 137 of the pair of jigs 130 are positioned at different heights in the jig height direction HT perpendicular to the radial direction RD. Therefore, the variation range among the products (rotors 3) in the amount of displacement X in the thickness direction HT of the lamination stack 11 between the shrink fit portion P1 with the shaft 20 and an outermost portion P2 of the stack is reduced to about half of that of the rotor core 410 and the shaft 420 joined together by a conventional producing method as shown in FIG. 17.

Accordingly, the producing method of a rotor 3 for a motor 1 according to the second example of the embodiment provides the advantageous effects of improving the assembling accuracy of the rotor core 10 and the shaft 20 and enabling production of high performance rotors 3 for motors 1 at low cost.

In the method for producing the rotor 3 for the motor 1 according to the second example of the embodiment, the pair of jigs 130 each have the flat plate-like base 134 connecting the radially inner peripheral portion 135 and the radially outer peripheral portion 137, and that the radially inner peripheral portion 135 and the radially outer peripheral portion 137 each protrude from the base 134 in the jig height direction HT. Therefore, the radially inner peripheral portion 135 and the radially outer peripheral portion 137 can be set to respective heights in accordance with an amount of displacement X that is desired to be restricted in the thickness direction HT of the lamination stack 11 after it has been shrink-fitted, as shown in FIG. 12.

INDUSTRIAL APPLICABILITY

As is clear from the above description, according to the invention, it is possible to produce rotors for motors with a rotor core made of a lamination stack and a shaft being precisely joined to provide a low cost and high performance.

REFERENCE SIGNS LIST

1 Motor
3 Rotor
10 Rotor core
11 Lamination stack
11a, 11b End faces
11H Shaft bore
12 Thin steel sheet
12H Through hole
20 Shaft
30H Shaft hole
30, 130 Pair of jigs
30a Inclined surface
31, 131 First jig
32, 132 Second jig
35, 135 Radially inner peripheral portion
37, 137 Radially outer peripheral portion
134 Base
F Clamping force
HL Horizontal direction
HT Thickness direction, Height direction
RD Radial direction

The invention claimed is:

1. A method for producing a motor rotor, the rotor including a lamination stack made up of a stack of a plurality of thin steel sheets each formed with a through hole, the lamination stack having a shaft bore formed of the through holes of the thin steel sheets aligned with one another, the lamination stack being retained as a rotor core in a thickness direction of the lamination stack by a pair of jigs holding the lamination stack from both sides in the thickness direction, and a shaft being inserted into the shaft bore and coupled to the lamination stack by shrink fitting, wherein the pair of jigs each include a shaft hole for the shaft to pass through, the method comprising:

orienting the pair of jigs comprising a first jig and a second jig such that the first jig and the second jig are disposed on opposite sides of the lamination stack in an axial direction of the lamination stack;

the first jig having a surface in contact with the lamination stack, the first jig surface having a radially inner peripheral portion and a radially outer peripheral portion;

the second jig having a surface in contact with the lamination stack, the second jig surface having a radially inner peripheral portion, and a radially outer peripheral portion;

the radially outer peripheral portion of the first jig surface being oriented closer to the lamination stack than the radially inner peripheral portion of the first jig surface such that the radially outer peripheral portion of the first jig surface is in contact with the lamination stack and the radially inner peripheral portion of the first jig surface is not in contact with the lamination stack, and the radially inner peripheral portion of the second jig surface being oriented closer to the lamination stack than the radially outer peripheral portion of the second jig surface such that the radially inner peripheral portion of the second jig surface is in contact with the lamination stack and the radially outer peripheral portion of the second jig surface is not in contact with the lamination stack.

2. The method for producing a motor rotor according to claim 1,
wherein the pair of jigs include either a truncated cone shape, such that the radially inner peripheral portion is higher than the radially outer peripheral portion toward one side in the jig height direction with reference to a horizontal direction, or an inverted truncated cone shape, such that the radially inner peripheral portion is lower than the radially outer peripheral portion,
the pair of jigs being made up of a first jig and a second jig having the same shape, the truncated cone shape or the inverted truncated cone shape.

3. The method for producing a motor rotor according to claim 2, wherein the pair of jigs are formed in the truncated cone shape.

4. The method for producing a motor rotor according to claim 2, wherein the pair of jigs are formed so that the radially inner peripheral portions and the radially outer peripheral portions are connected through inclined surfaces.

5. The method for producing a motor rotor according to claim 4, including:
a lamination-stack retaining step of retaining the lamination stack held by the pair of jigs with a predetermined clamping force from both sides of the lamination stack in the thickness direction;
a lamination-stack heating step of heating the retained lamination stack after the lamination-stack retaining step; and
a shaft shrink-fitting step of, after heating the lamination stack, inserting the shaft into the shaft bore of the lamination stack through the shaft holes of the pair of jigs, and shrink-fitting the shaft and the lamination stack.

6. The method for producing a motor rotor according to claim 2,
wherein the pair of jigs each have a flat plate-like base connecting the radially inner peripheral portion and the radially outer peripheral portion, and
the radially inner peripheral portion and the radially outer peripheral portion are formed to protrude from the base in the jig height direction.

7. The method for producing a motor rotor according to claim 6, including:
a lamination-stack retaining step of retaining the lamination stack held by the pair of jigs with a predetermined clamping force from both sides of the lamination stack in the thickness direction;
a lamination-stack heating step of heating the retained lamination stack after the lamination-stack retaining step; and
a shaft shrink-fitting step of, after heating the lamination stack, inserting the shaft into the shaft bore of the lamination stack through the shaft holes of the pair of jigs, and shrink-fitting the shaft and the lamination stack.

8. The method for producing a motor rotor according to claim 2, including:
a lamination-stack retaining step of retaining the lamination stack held by the pair of jigs with a predetermined clamping force from both sides of the lamination stack in the thickness direction;
a lamination-stack heating step of heating the retained lamination stack after the lamination-stack retaining step; and
a shaft shrink-fitting step of, after heating the lamination stack, inserting the shaft into the shaft bore of the lamination stack through the shaft holes of the pair of jigs, and shrink-fitting the shaft and the lamination stack.

9. The method for producing a motor rotor according to claim 1, wherein the pair of jigs are formed so that the radially inner peripheral portions and the radially outer peripheral portions are connected through inclined surfaces.

10. The method for producing a motor rotor according to claim 9, including:
a lamination-stack retaining step of retaining the lamination stack held by the pair of jigs with a predetermined clamping force from both sides of the lamination stack in the thickness direction;
a lamination-stack heating step of heating the retained lamination stack after the lamination-stack retaining step; and
a shaft shrink-fitting step of, after heating the lamination stack, inserting the shaft into the shaft bore of the lamination stack through the shaft holes of the pair of jigs, and shrink-fitting the shaft and the lamination stack.

11. The method for producing a motor rotor according to claim 1,
wherein the pair of jigs each have a flat plate-like base connecting the radially inner peripheral portion and the radially outer peripheral portion, and
the radially inner peripheral portion and the radially outer peripheral portion are formed to protrude from the base in the jig height direction.

12. The method for producing a motor rotor according to claim 11, including:
a lamination-stack retaining step of retaining the lamination stack held by the pair of jigs with a predetermined clamping force from both sides of the lamination stack in the thickness direction;
a lamination-stack heating step of heating the retained lamination stack after the lamination-stack retaining step; and
a shaft shrink-fitting step of, after heating the lamination stack, inserting the shaft into the shaft bore of the lamination stack through the shaft holes of the pair of jigs, and shrink-fitting the shaft and the lamination stack.

13. The method for producing a motor rotor according to claim 1, including:
a lamination-stack retaining step of retaining the lamination stack held by the pair of jigs with a predetermined clamping force from both sides of the lamination stack in the thickness direction;
a lamination-stack heating step of heating the retained lamination stack after the lamination-stack retaining step; and
a shaft shrink-fitting step of, after heating the lamination stack, inserting the shaft into the shaft bore of the lamination stack through the shaft holes of the pair of jigs, and shrink-fitting the shaft and the lamination stack.

* * * * *